(12) United States Patent
Puegner et al.

(10) Patent No.: US 8,861,060 B2
(45) Date of Patent: Oct. 14, 2014

(54) SPECTRAL DECOMPOSITION DEVICE AND MANUFACTURING THE SAME

(75) Inventors: Tino Puegner, Dresden (DE); Jens Knobbe, Dresden (DE); Heinrich Grueger, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 304 days.

(21) Appl. No.: 13/231,094

(22) Filed: Sep. 13, 2011

(65) Prior Publication Data

US 2012/0236382 A1 Sep. 20, 2012

(30) Foreign Application Priority Data

Sep. 14, 2010 (DE) .......................... 10 2010 040 768

(51) Int. Cl.
| | |
|---|---|
| G02B 26/08 | (2006.01) |
| G02B 26/10 | (2006.01) |
| G02B 26/12 | (2006.01) |
| G01J 3/02 | (2006.01) |
| G01J 3/18 | (2006.01) |
| G01J 3/04 | (2006.01) |

(52) U.S. Cl.
CPC ............. *G01J 3/0256* (2013.01); *G01J 3/0208* (2013.01); *G01J 3/0237* (2013.01); *G01J 3/0202* (2013.01); *G01J 3/1804* (2013.01); *G01J 3/04* (2013.01); *G01J 3/021* (2013.01)
USPC .................................... 359/209.1; 359/197.1

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45

See application file for complete search history.

(56) References Cited

U.S. PATENT DOCUMENTS

2005/0052649 A1 * 3/2005 Tsujita .......................... 356/328
2009/0262346 A1 * 10/2009 Egloff et al. .................. 356/326

FOREIGN PATENT DOCUMENTS

DE   10 2008 019 600 A1   10/2009

* cited by examiner

*Primary Examiner* — William Choi
*Assistant Examiner* — Sharrief Broome
(74) *Attorney, Agent, or Firm* — Keating & Bennett, LLP

(57) ABSTRACT

For achieving balance between manufacturing effort and spectrometer accuracy, a spectral decomposition device is not completely integrated into a substrate stack, but, for example, after manufacturing the substrate stack in the manufacturing process, the opportunity of compensating inaccuracies in substrate stack manufacturing is given by mounting a component with a suitable optical functional element to a window, like, e.g., an entry, exit or intermediate window of the substrate stack, to at least partially cover the respective window, wherein the optical functional element is, for example, an entry aperture, an exit aperture or also part of an optics or an optical element having a spectrally decomposing effect. The substrate stack may be manufactured on wafer level and the manufacturing tolerances in this manufacturing may be loosened, as the subsequent substrate stack-individual mounting or even window-individual mounting of the components may compensate the fluctuations which resulted in substrate stack manufacturing.

9 Claims, 21 Drawing Sheets

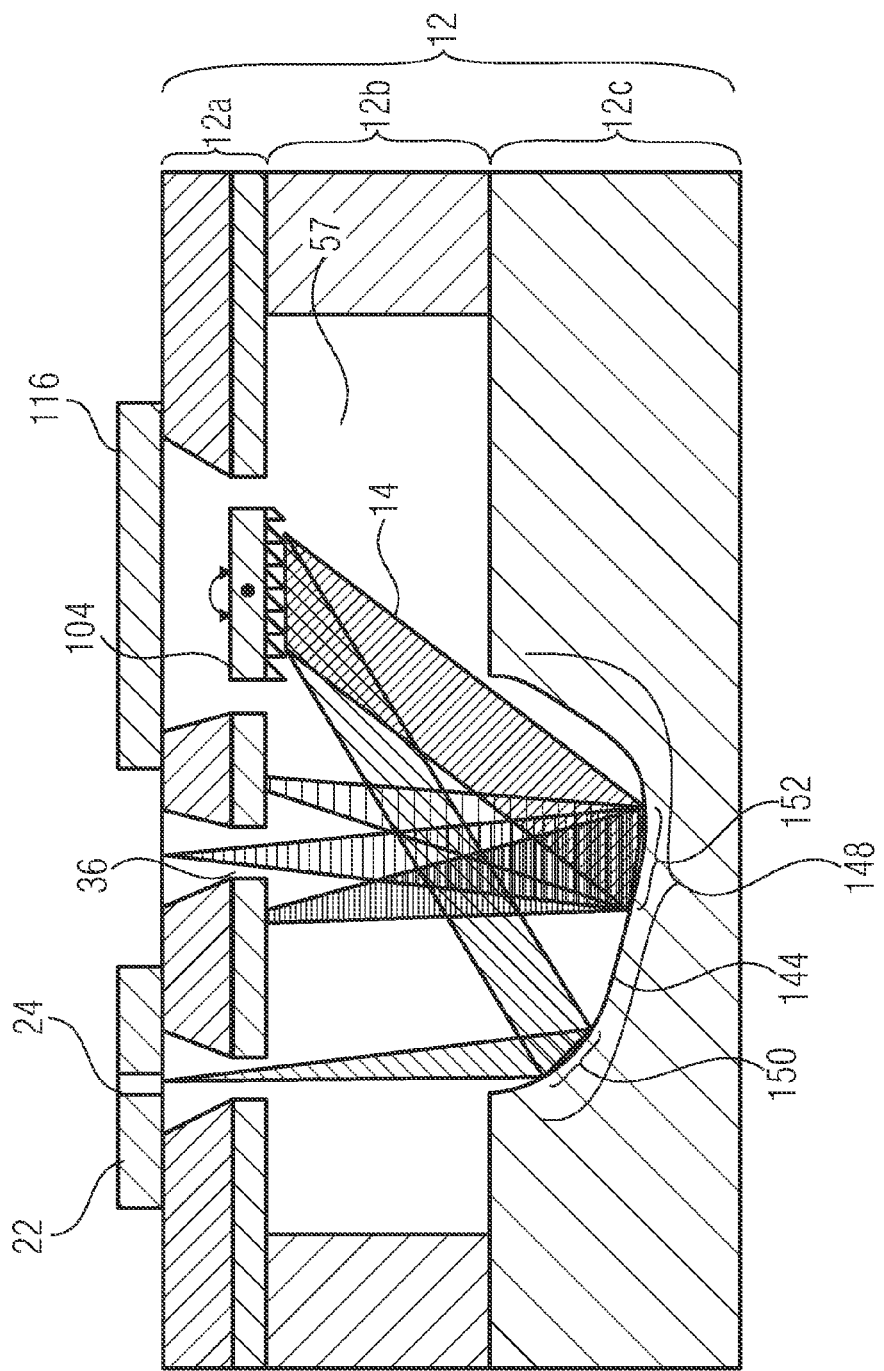

SPECTRAL DECOMPOSITION DEVICE AND MANUFACTURING THE SAME

CROSS-REFERENCE TO RELATED APPLICATIONS

This application claims priority from German Patent Application No. 102010040768.2-54, which was filed on Sep. 14, 2010, and is incorporated herein in its entirety by reference.

BACKGROUND OF THE INVENTION

The present invention relates to spectral decomposition devices and the manufacturing of the same and in particular to spectral decomposition devices which are manufactured from substrate stacks.

In conventional technology, basically two main groups of spectroscopic systems are described, in particular scanning spectrometers.

The first group is made up of discretely set-up, macroscopic systems. The individual functional elements are separately manufactured for such systems and subsequently individually mounted. Adjustment and calibration is here done during mounting by the use of several suitable adjustment devices.

The second group is made up of partially integrated, hybridly set-up, miniaturized systems. With such systems, as described in DE 10 2008 019 600 A1, several functional elements are integrated in one mainly miniaturized component. For example, the entry and exit gaps may be integrated together via microtechnical manufacturing methods in a substrate which may simultaneously be part of the housing, or the grid/grating and its drive may be present as a highly integrated microtechnologically manufactured unit. The setup of multifunctional, miniaturized optomechanical building groups enables a substantially smaller construction, however presents substantially higher requirements on the manufacturing of the integrated functional elements and, apart from that, limits the possibilities for adjustment and calibration.

The greatly limited adjustment possibilities in contrast to the discretely set-up macroscopic scanning grating spectrometers may have a negative effect on economic manufacturing which is increased due to the high requirements on the manufacturing and the costs involved. Thus, for example in the variants described in DE 10 2008 019 600 A1, a distance adjustment in the staple direction of the involved substrates turns out to be difficult. The distances of the functional elements to each other, which are located in or at the substrates, are then basically determined by the thicknesses of the substrates and their respective tolerances. The functional principle of the variants described in DE 10 2008 019 600 A1 then, however, generally needs relatively tight thickness tolerances of the involved substrates.

Further, in both groups of spectrometers having a scanning grating, different system variants having different spectral characteristics and spectral ranges may basically only be achieved by changing the system design and the interconnected changes to the functional elements. Thus, e.g. the spectral range of the variants described in DE 10 2008 019 600 A1 among others depends on the lateral position of the exit gap in the substrate. A change of this position, however, needs at least one modified layout for the respective substrate. A standardization of different substrate designs in this case is not possible. Every variation in the system thus generates additional manufacturing costs.

SUMMARY

According to an embodiment, a spectral decomposition device may have a substrate stack in which an optical functional element having a spectrally decomposing effect and optics are formed such that in the substrate stack a convolved optical path is formed which extends between an optical entry window formed in the substrate stack and an exit window or a detector zone formed in the substrate stack, wherein the spectral decomposition device additionally has an entry-side component which is mounted to the substrate stack such that it at least partially covers the optical entry window and which defines an optical entry aperture of the spectral decomposition device, and/or the spectral decomposition device additionally has an exit-side component which is mounted to the substrate stack such that it at least partially covers the optical exit window and which defines an optical exit aperture of the spectral decomposition device.

According to another embodiment, a spectral decomposition device may have a substrate stack in which an optical functional element having a spectrally decomposing effect and optics are formed such that in the substrate stack a convolved optical path is formed which extends between an optical entry window formed in the substrate stack, and an optical exit window formed in the substrate stack, wherein the spectral decomposition device additionally comprises an exit-side component which is mounted to the substrate stack such that it at least partially covers the optical exit window and which comprises a detector which is implemented to detect electromagnetic radiation propagating through the optical exit window along the convolved optical path, wherein a projection of a beam-blocking part of the exit-side component along a layer thickness direction to the substrate stack is spaced apart laterally from the optical entry window and an edge of the substrate stack.

According to another embodiment, a spectral decomposition device may have a substrate stack made of structured substrates in which a buried optical path space with an optical entry window and an optical intermediate window are defined; and a component with an optical functional element which is mounted to the substrate stack and which at least partially covers the optical intermediate window such that the optical functional element abuts on the buried optical path space via the optical intermediate window, and in the buried optical path space a convolved optical path forms which is defined by optics and an optical functional element comprising a spectrally decomposing effect and extends between the optical entry window and an optical exit window or a detector zone which is or are formed in the substrate stack, wherein the optical functional element is arranged at a bend of the convolved optical path and forms a first part of the optics, while a second part of the optics is formed in the substrate stack or comprises the optical functional element comprising a spectrally decomposing effect.

According to another embodiment, a method for manufacturing a spectral decomposition device may have the steps of manufacturing a plurality of substrate stacks from structured substrates in which a buried optical path space is defined, wherein the optical path space comprises at least one window; and subsequent substrate stack-individual mounting of a component to the substrate stacks so that the respective component at least partially covers the at least one window, and so that an optical functional element comprising the component is adjacent to the buried optical path space via the at least one window in the substrate stack and helps to define a convolved optical path which forms in the buried optical path space and is defined by optics and an optical functional element comprising a spectrally decomposing effect, which are formed in the respective substrate stack with the mounted component.

According to another embodiment, a method for manufacturing a spectral decomposition device may have the steps of manufacturing a plurality of substrate stacks in each of which an optical functional element comprising a spectrally decomposing effect and an optics are formed such that in the optical path space a convolved optical path is formed which extends from an optical entry window formed in the respective substrate stack to an optical exit window or a detector zone which is formed by the substrate stack, in substrate stack parts each comprising disjunct amounts of substrates of the respective substrate stack and which may each be combined into a respective substrate stack, wherein an optical entry aperture and/or an optical exit aperture is formed in a substrate stack part of the respective substrate stack in which neither the optical functional element comprising a spectrally decomposing effect nor the optics is formed; and subsequent substrate stack-individual connecting of the substrate stack parts into a respective substrate stack.

A central idea of the present invention is to have found that, for achieving a more balanced relationship between the manufacturing effort on the one hand and spectrometer accuracy on the other hand, it is better not to integrate a spectral decomposition device completely into a substrate stack, but, for example, after manufacturing the substrate stack to have an opportunity in the manufacturing process of compensating for inaccuracies in substrate stack manufacturing by mounting a component with a suitable optical functional element to the window, like, e.g., an entry, exit or intermediate window of the substrate stack to at least partially cover the respective window, wherein the optical functional element is, for example, an entry aperture, an exit aperture or also part of optics or an optical element which has a spectrally decomposing (or resolving or splitting) effect. The substrate stack may be manufactured on wafer level and the manufacturing tolerances in this manufacturing may be loosened as the subsequent substrate stack-individual mounting or even window-individual mounting of the components may compensate for the fluctuations which resulted in substrate stack manufacturing.

A further finding of the present invention is that the above object may alternatively be achieved by substrate stacks of the spectral decomposition device being manufactured in parts which together result in a complete substrate stack, but that the same are connected to each other substrate stack-individually and not on wafer level and that an optical entry aperture and/or an optical exit aperture is formed in a substrate stack part of a respective substrate stack in which neither the functional element having an optically spectrally decomposing effect nor the optics is formed. In this way, the compensation, for example, of manufacturing fluctuations of the substrate stack parts and previous mountings of the same when mounting the last two parts is still possible by a lateral change of position of the entry and/or exit aperture relative to other functional elements, just like a possible substrate stack-individual setting of a detectable spectral range of the spectral decomposition devices.

Advantageous implementations for the subject matter of the dependent patent claims

BRIEF DESCRIPTION OF THE DRAWINGS

In the following, embodiments of the present invention are explained in more detail with reference to the accompanying drawings, in which:

FIGS. 1b,1c show schematic block diagrams for illustrating different possibilities for the internal implementation of the spectral decomposition device of FIG. 1a;

FIG. 1d shows a stereoscopic image of a section of a spectral decomposition device according to an alternative embodiment with respect to the embodiment of FIG. 1a;

FIGS. 2b,c show schematical block diagrams for illustrating different possibilities for an internal implementation of the spectral decomposition device of FIG. 2a;

FIGS. 3b,3c show schematical block diagrams for illustrating possibilities for the internal implementation of the spectral decomposition devices of FIG. 3a;

FIG. 11b shows a top view onto the configuration of FIG. 11a;

FIG. 12 shows top views onto different implementations of a component in FIGS. 8a, 9, 10 and 11a;

FIG. 18 shows a sectional view of a spectral decomposition device according to a still further embodiment.

DETAILED DESCRIPTION OF THE INVENTION

Figure 1A:
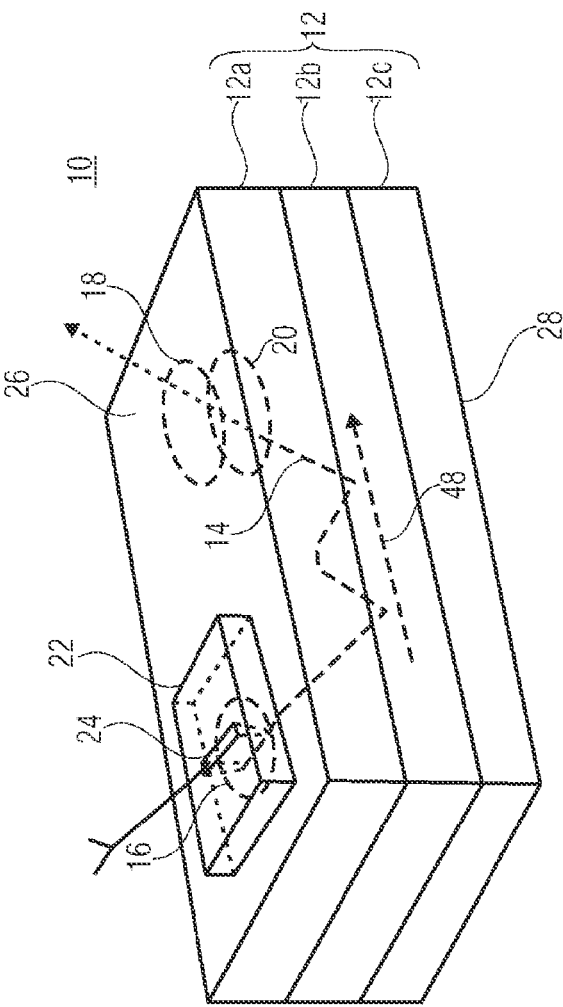
FIG. 1a shows a stereoscopic image of a spectral decomposition device according to one embodiment.

Before different embodiments of the present application are described in the following, it is to be noted that in these figures the same or functionally the same elements are pro- FIG. 1a shows a spectral decomposition device 10 having a substrate stack 12, i.e. a stack of, here exemplarily, three substrates 12a, 12b and 12c in which a suitable optical spectrally decomposing functional element and an optics or a lens (not illustrated in FIG. 1a) are formed such that in the substrate stack 12 a convolved optical path 14 is formed which extends between an optical entry or input window 16 formed in the substrate stack 12 and an optical exit or output window 18 or an optical detector zone 20 formed in the substrate stack 12. Additionally, the spectral decomposition device comprises an entry-side component 22 which is mounted to the substrate stack 12 such that it at least partially covers the entry window 16 and which defines an entry aperture 24 of the spectral decomposition device 10. The optics advantageously comprises characteristics converging or expanding the imaging optical paths to map or image entry windows onto exit windows and, in between times, for example, parallelize radiation to an optical functional element having spectrally decomposing effects, and may thus also be referred to as imaging optics as is the case in the embodiments described in the following.

As is illustrated in FIG. 1a, the substrate stack may, for example, comprise three substrates 12a, 12b and 12c. The number of substrates may, however, also only be two or more than three. The middle substrate 12b may, for example, be a pure spacer substrate, which otherwise comprises no optical functional elements but only serves for mounting and for defining the distance between the adjacent substrates 12a and 12c. In particular, it may also be seen from the following embodiments that the substrate 12a-12c of the stack 12 may be structured such that in the substrate stack 12 a buried optical path space is formed which is, however, not illustrated in FIG. 1a for reasons of clarity, and for example opens outwards at the optical entry window 16 and at the optical exit window 18, if present.

Due to the stacked setup of the substrate stack 12, the spectral decomposition device 10 has a first main side 26 and a second main side 28 which are opposite each other along the stacking or substrate thickness direction and are directed into opposing directions and are connected to each other by side surfaces. In FIG. 1a, merely exemplarily the case was illustrated that the optional exit window 18 and the optical entry window 16 are located at the same main side 26. It would also be possible that the convolved optical path 14 again bends on the exit side into the other side so that the optional exit window would be arranged on the opposite main side 28.

Before further details are explained with reference to FIGS. 1b and 1c as to how the actual spectral decomposition function may be realized in the substrate stack 12, it is to be noted that the optical entry window 16 and the optional optical exit window 18 are not necessarily physical openings in the substrate stack 12 or in the case of FIG. 1a in the substrate 12a which also forms the main side 26, but that these windows may also be locally transparent zones of the substrate stack 12 which are surrounded laterally by substrate stack zones which appear non-transparent in the thickness direction. The substrate 12a may, for example, be formed of a transparent material which is, however, provided with a non-transparent coating or layer which is locally remote for forming the optical entry window 16 or the optional optical exit window 18. In the following, for reasons of simplicity, it is assumed that the windows are openings, but, as mentioned above, this may also be different in the following embodiments.

Although specific embodiments will be provided in the following as to how the substrate stack 12 may be formed with the component 22 in order to result in a spectral decomposition device, in the following different possibilities are indicated with reference to FIGS. 1b and 1c. As is illustrated in FIG. 1b, in the substrate stack 12 as part of the above-mentioned optics a collimator 30 and an optical focusing element 32 could be formed. The collimator 30 is, for example, an imaging optical element which may be formed in the form of a concave and/or convex minor, wherein also a refractive implementation would be possible. The optical focusing element 32 may also be concave mirrors or refocusing optics, wherein again also a refractive implementation would be possible. As will become clear in the following, the substrates 12a-c may be formed such that the optical path is formed in a cavity of the substrate stack which will be referred to as optical path space in the following.

Figure 1B:
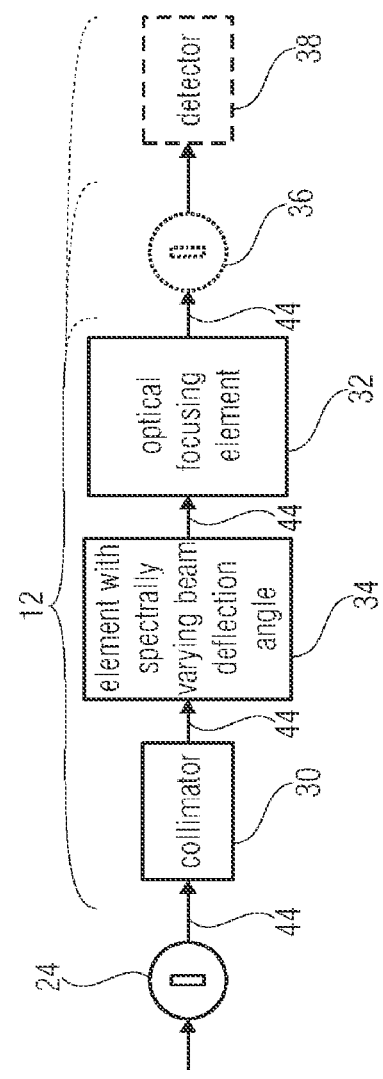

FIG. 1b shows the different functional elements of the spectral decomposition device 10 of FIG. 1a which may be implemented according to one embodiment in the spectral decomposition device 10, in the optical path direction sequentially from left to right. As may be seen, between the collimator 30 and optical focusing element 32, an element with a spectrally varying beam-deflecting angle may be located, like, e.g., a dispersive element, a refraction grating, a photonic crystal or a dispersion prism, wherein the element 34 may be integrated in the substrate stack 12 statically or movable by a micromechanical actuator. The element 34 may in particular have a reflective or refractive effect.

As is indicated by the braces, in addition to the collimator 30, the element 34 and the optically focusing element 32, still further elements may be integrated in the substrate stack 12. It would, for example, be possible for the optical exit opening 18 to be formed in the substrate stack 12 and simultaneously function as an optical exit aperture or exit gap 36 in order to filter out a corresponding part of the spectrum which was spectrally "fanned out" in an angle-selective way by the element 34. A detector 38 might then be mounted from the outside to the substrate stack 12 in the direction of the optical path behind the aperture 36. Alternatively, the detector 38 may be part of the substrate stack 12. The local limitation of the detection-sensitive area of the detector 38 may simultaneously take over the function of the exit aperture, wherein in this case the exit aperture 36 may be missing. The detector 38 may additionally be both an individual or single detector, i.e. a detector which determines, for each sampling or scan, one value across the complete detection area, or a line detector with a plurality of individual detectors which are arranged in one line. The detector 38 may also be a detector field, i.e. an array of detectors or a detector matrix.

Figure 1C:
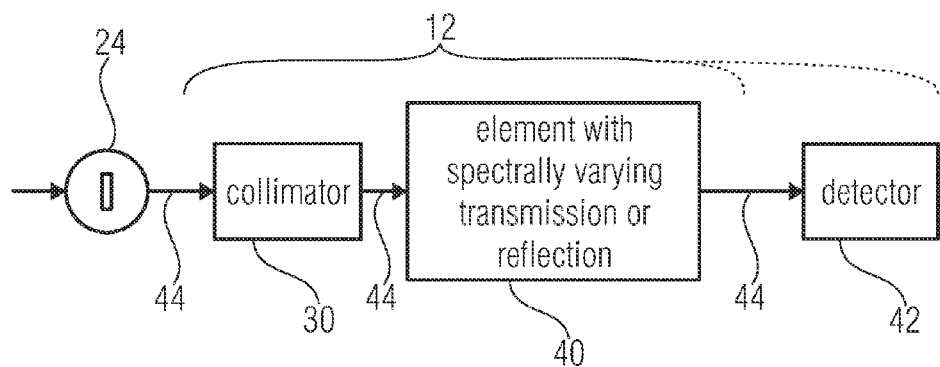

An alternative embodiment is illustrated in FIG. 1c. According to this embodiment, in the substrate stack 12 next to a collimator 30, as part of the above-mentioned imaging optics, an element with a spectrally varying transmission or reflection characteristic, i.e. an element 40, is integrated which, as illustrated in FIG. 1c, may be arranged in the direction of the optical path behind the collimator 30. The element 40 may, for example, be an interferometric filter, a tunable micromechanical filter, such as a Fabry-Perot interferometer with a micromechanical element for translational movements of a platelet, plate or membrane with respect to a fixed platelet, plate or membrane for changing the spectral transmission. Also the element 40 may have a reflective or transmissive effect. A detector 42 which is arranged in the direction of the optical path behind the element 40 may, as is illustrated in FIG. 1c, also be integrated in the substrate stack 12 or not.

As was mentioned above, the elements 30, 32, 34 and 40 may each be reflective per se, whereby a corresponding bend in the convolved optical path 14 results and thus an angular deflection between the sections 44 of the optical path at the functional elements 24, 30, 34, 32, 36 or 24, 30, 40 and 42, or not. For obtaining a convolved optical path 14, in addition to the functional elements illustrated in FIGS. 1b and 1c, also optical elements having a reflective effect, like, e.g., deflecting mirrors such as plane, concave or convex mirrors, may be arranged or integrated in the substrate stack 12. According to the embodiments described in the following, for example the optical functional element having a decomposing effect is formed together with the optical exit opening 18 or the optical exit aperture 36 in a first substrate 12a, whereas a collimating refractive optical functional element is formed in a second substrate 12c.

As will be described later with reference to FIG. 4, it is now possible in manufacturing to manufacture the substrate stack 12 with loose requirements with respect to manufacturing accuracy, as deviations from the desired geometry due to the larger manufacturing tolerances may be compensated when mounting the component 22 or adjusting the optical entry aperture 24, like, e.g., an entry gap, relative to the entry opening 16 or the other components 30-42. For example, manufacturing fluctuations regarding the thickness of the substrate 12a-12c of the stack 12 and in particular of spacer substrates, like, e.g., the substrate 12b, may be compensated by fixing the component 22 with a settable gap between the same and the main side 26, as will be described in the following with reference to special embodiments for fixing. A lateral position of the entry gap 24 may be set such that possible lateral relative position deviations of the substrates with respect to each other, like, e.g. the substrates 12a and 12c, may be compensated. The substrate stack 12 may thus be manufactured with manufacturing tolerances on wafer level, which may be maintained relatively easily, whereupon the component 22 may be adjusted or fixed substrate stack-individually or even opening-individually. It is to be noted here that, as will be described in the following figures, providing a component 22 with a suitable optical functional element may also be provided at an opening other than the optical entry opening, like, e.g., the optional exit opening or an intermediate opening, wherein examples of this are given in the following. In this case, the component may be adjusted and mounted opening-individually or in any case substrate stack-individually.

Figure 1D:
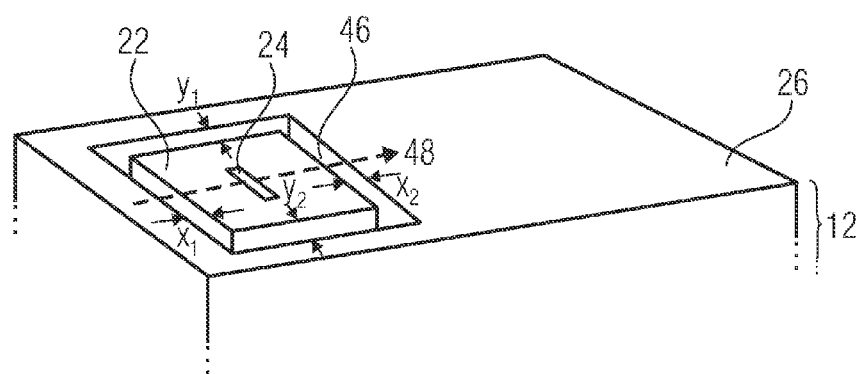

As has just been described above, in the manufacturing of the spectral decomposition device 10 of FIG. 1a, the component 22 is suitably adjusted, positioned and fixed when mounting to the main side 26. In this respect, the main side 26 of the substrate stack 12 ought to comprise a suitable "manoeuvring" distance for fixing the component 22, so that the component 22 may be shifted laterally in a suitable area during an adjustment process in order to be able to change the entry aperture 24 for compensating the manufacturing deviations in its lateral position, in order to execute the actual fixing only later. In FIG. 1a, the main side 26 was exemplarily illustrated as a level area in which only the entry opening 16 and the optional exit opening 18 were formed, wherein it was described that possibly still further openings may be formed in this main side. For the above-mentioned manoeuvring distance it is not necessary, however, for the main side 26 to be completely level. According to one embodiment, as indicated in FIG. 1d, the main side 26 of the substrate stack 12 in which the entry opening is formed is not level. But the main side 26, according to the embodiment of FIG. 1d, is implemented levelly around the entry opening in an area which is larger than the component 22 so that possible elevations or protrusions in the main side 26 are spaced apart from the component 22 in its adjusted and fixed position by at least one gap 46. In the case of FIG. 1b, this level section exemplarily forms the bottom of a recess or indentation in the main side 26. It would also be possible, however, that the entry opening 16 is formed at a protrusion of the main side 26, wherein in this case the lateral extension of the protrusion around the entry opening would not be that critical. In other words, the main side 26 around the entry opening 16 ought to comprise a level section, and the main side 26 ought to be formed such that, with an imaginary solution of mounting the component 22, a translational lateral movement of the same would be possible at least along a lateral dimension, along which the convolved optical path 14 is directed from the entry aperture 24, wherein the direction is indicated in FIG. 1a by a dashed part 48, i.e. by more than 1 μm in both directions along the lateral dimension. In FIG. 1d, this meant that the gap distances $x_1$ and $x_2$ have to be larger than 1 μm. The same may apply for the distances $y_1$ and $y_2$.

Figure 2A:
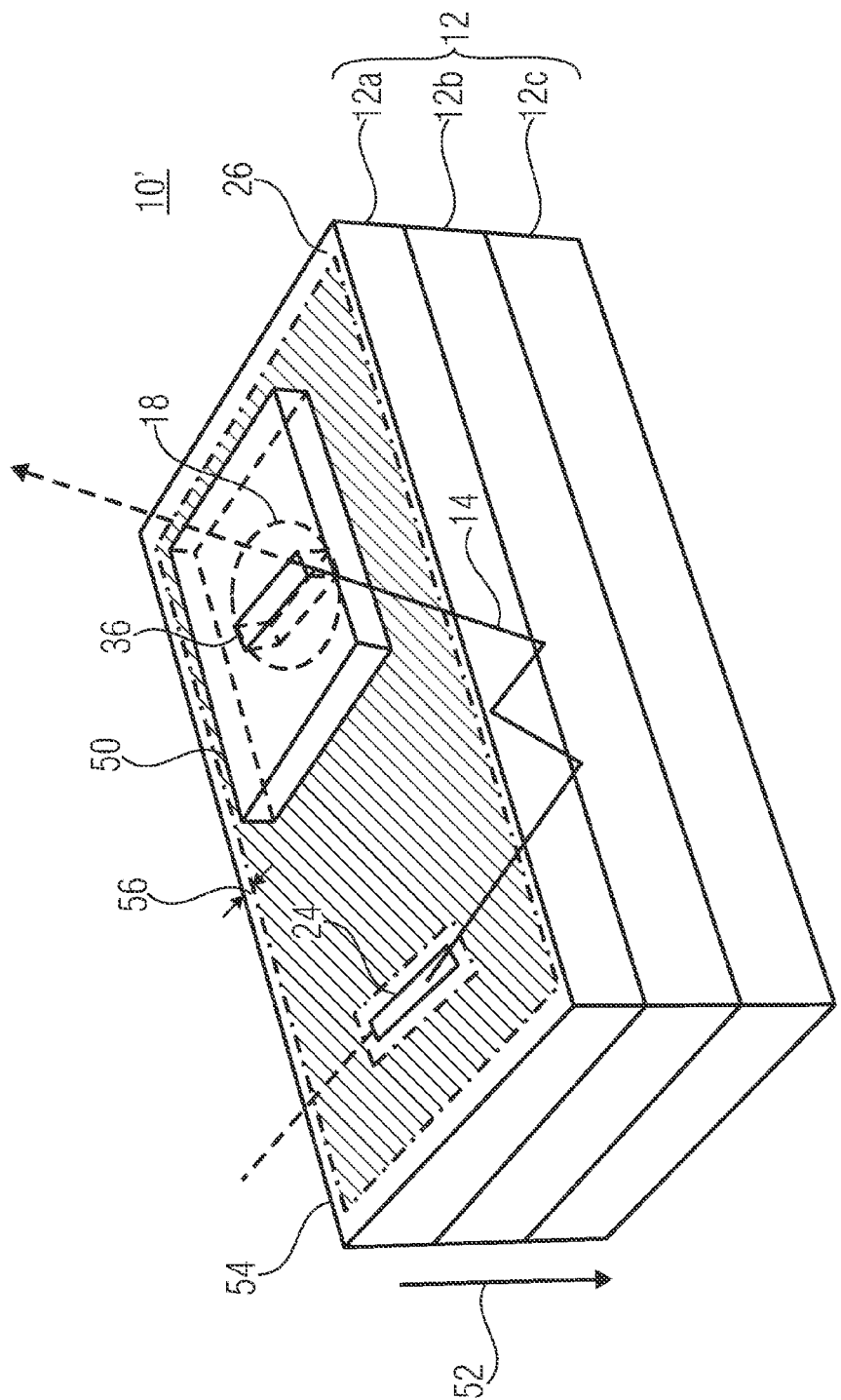
FIG. 2a shows a stereoscopic image of a spectral decomposition device according to a further embodiment.

In FIG. 2a, a further embodiment of a spectral decomposition device 10' is illustrated. It comprises a substrate stack 12 of again exemplarily three substrates 12a, 12b and 12c which are stacked along a stacking direction and connected to each other and structured and manufactured such that in the same a suitable functional element having a spectrally decomposing effect and imaging optics are formed such that in the substrate stack 12 a convolved optical path is formed which extends between an optical entry opening which is, in the exemplary case of FIG. 2a, also formed as an entry aperture 24 and formed in the substrate stack 12, and an exit opening 18 which is also formed in the substrate stack 12. Additionally, the spectral decomposition device 10' comprises an exit-side component 50 which is mounted to the substrate stack 12 and there again exemplarily to the main side 26 of the same, so that it at least partially covers the exit opening 18 and defines an exit aperture 36 of the spectral decomposition device 10'.

FIG. 2b again shows a possibility for an internal implementation of the substrate stack 12. According to this implementation, in the substrate stack 12, for example as part of the above-mentioned imaging optics, a collimator 30 and an optical focusing element 32 are formed, between which in the direction of the optical path an element 34 with a spectrally varying spectral deflection angle is arranged. As is illustrated in FIG. 2a, the entry aperture 24 may be formed in the substrate stack 12, wherein this is optional, as was described above with reference to FIG. 1a. The exit aperture 36 follows in the direction of the optical path after the optical focusing element 32, and after the exit aperture 36 again a detector 38 may be provided which is not illustrated in FIG. 2a for reasons of clarity, however. As is indicated in FIG. 2b, the detector may, for example, be part of the component 50 which also forms the exit aperture 36.

Similar advantages, as have been described with reference to FIGS. 1a-d, may also be achieved according to the configuration of FIGS. 2a and 2b, as manufacturing tolerances in the manufacturing of the substrate stack 12, which is, for example, manufactured on wafer level, may be compensated by adjusting and positioning the component 50 and, along with it, the exit gap 36. Additionally, as will be described in the following, by the lateral positioning of the exit gap or the exit aperture 36, a spectral range may be set which may be detected by the spectral decomposition device 10'. For example, the detector would be arranged in the direction of the optical path behind the exit aperture 36 so that the detector 38 would have a detection-sensitive area which completely overlaps the exit aperture 36.

Figure 2B:
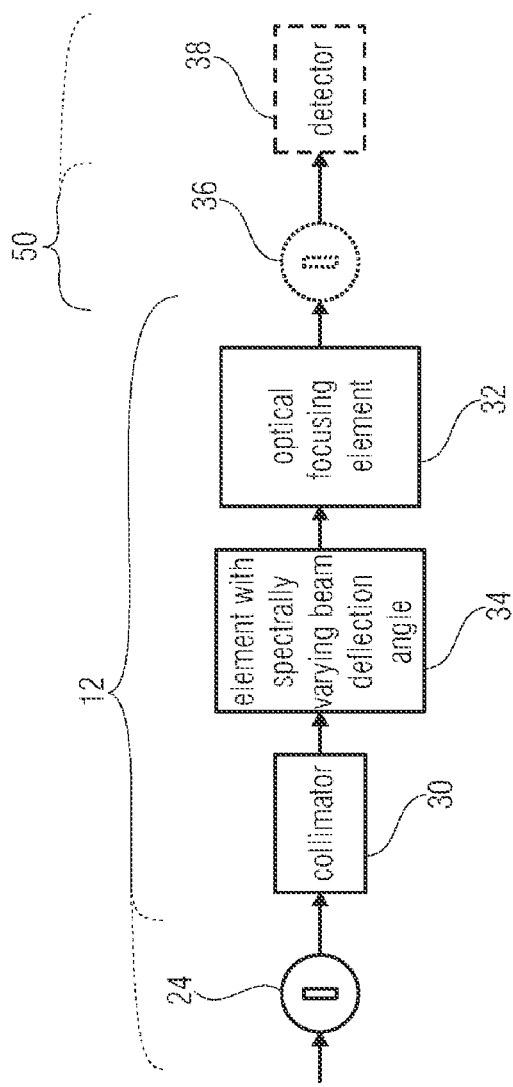
Figure 2C:
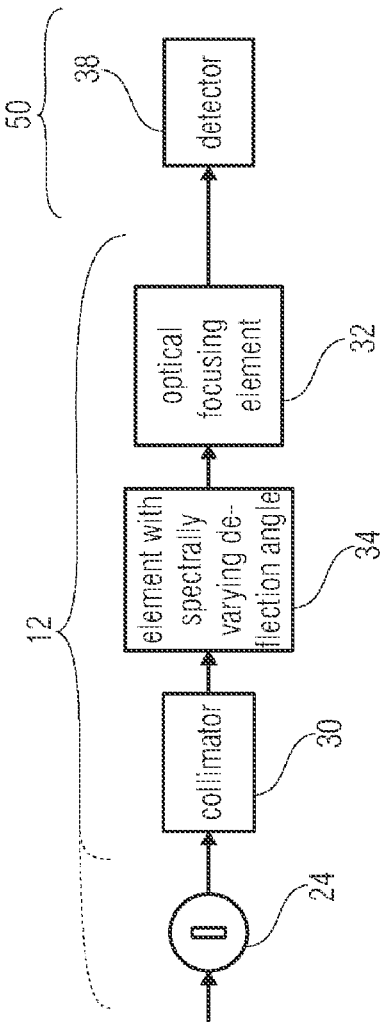

FIG. 2c shows an alternative to the embodiment of FIG. 2a, according to which the component 50 does not define the exit aperture 36 of the spectral decomposition device 10' but carries the detector 38 which, as was already described above with reference to FIG. 1b, may possibly be a line detector or a single detector or individual detector, wherein the detection-sensitive areas of the one or several single detectors may also take over the function of an entry aperture. In this case, by providing the additional component 50 and its additional mounting at the substrate stack 12, it is possible, just as in the case of FIG. 2b, to set a detectable spectral range of the spectral decomposition device 10'.

In both embodiments of FIGS. 2c and 2b, it is also possible, by setting a distance of the component 50 from the mounting surface around the exit opening 18, i.e. the main side 26, to possibly compensate manufacturing fluctuations in the manufacturing of the substrate stack 12 which result from a thickness fluctuation of the substrates in the substrate stack 12, in order, for example, to set a distance of the section of the optical path between the optical focusing element 32 and the exit aperture 36 or the detector 38, whereby, as mentioned above, all in all the relationship between the manufacturing effort on the one hand and the spectrometer precision on the other hand may be improved.

In the embodiment of FIG. 2c, a projection of a beam-blocking part of the exit-side component 50 in the direction of the substrate thickness or the direction of the substrate stack 52 onto the substrate stack 12 and the entry opening 24 and an edge 54 of the substrate stack 12 ought to be spaced apart laterally by a distance 56, i.e. continuously along the edge 54, so that the above-mentioned lateral adjustment possibilities of the component 50 result neither in an unwanted covering of the entry opening 24 nor in an unwanted projection of the component 50 beyond the edge 54 of the substrate stack 12. The distance 56 is, for example, 1 µm or more.

The distance along the edge 54 may also apply to the other components in the other figures. A lateral projection area or a footprint of the components of the embodiments, in any case smaller than 50% of the lateral area extension of the substrate stack, is advantageous.

In the following, implementations of the embodiment of FIG. 2b are described, wherein the element 34 and the optical exit opening 18 are formed in a first substrate 12a, while a second substrate 12c comprises an optical focusing functional element 32 which has a reflective effect and is arranged in the optical path between the element 34 and the exit opening 18.

Figure 3A:
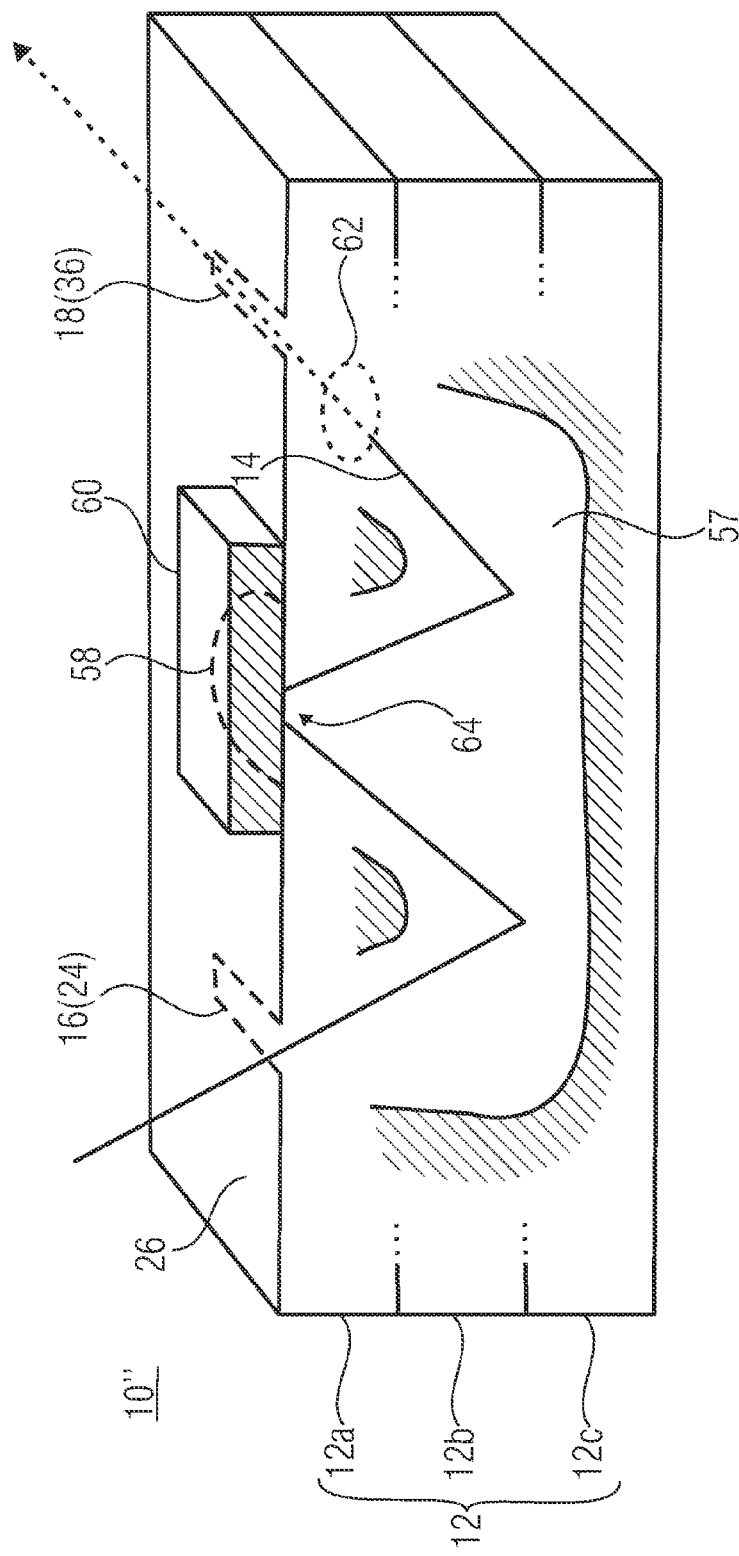
FIG. 3a shows a schematical spatial split image of a spectral decomposition device according to a further embodiment.

In FIG. 3a, a further embodiment for a spectral decomposition device 10" is illustrated. The spectral decomposition device 10" includes a substrate stack 12, here again exemplarily having three substrates 12a, 12b and 12c which are structured in order to form a buried optical path space 14 with an entry window or an entry opening which, in the exemplary case of FIG. 3a, define an entry aperture 24, and an intermediate window or an intermediate opening 58. Additionally, the spectral decomposition device 10" includes a component 60 with an optical functional element (not illustrated in FIG. 3a) which is mounted at the substrate stack 12 or in FIG. 3a exemplarily at the main side 26 at which the intermediate opening 58 is exemplarily formed, so that it at least partially covers the intermediate opening 58 and the optical functional element abuts on the optical path space 57 via the intermediate opening 58, and in the optical path space 57 a convolved optical path 14 forms which is defined by imaging optics and a functional element having a spectrally decomposing effect and extends between the entry opening 24 and an exit opening or an optical detector zone 62 which is formed in the substrate stack 12. The optical functional element of the component 60 is arranged at a bend 64 of the convolved optical path 14 and may form a first part of the imaging optics, while a second part of the imaging optics is formed in the substrate stack 12, or may include the optical functional element having a spectrally decomposing effect.

Figure 3B:
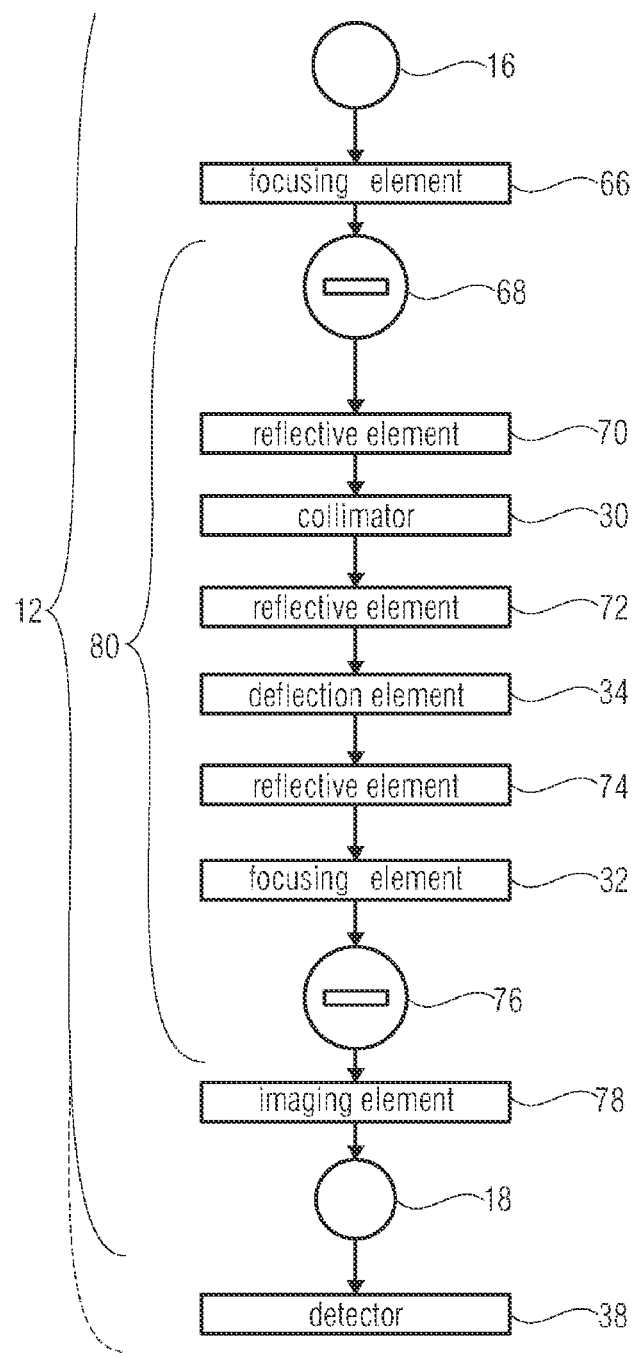
Figure 3C:
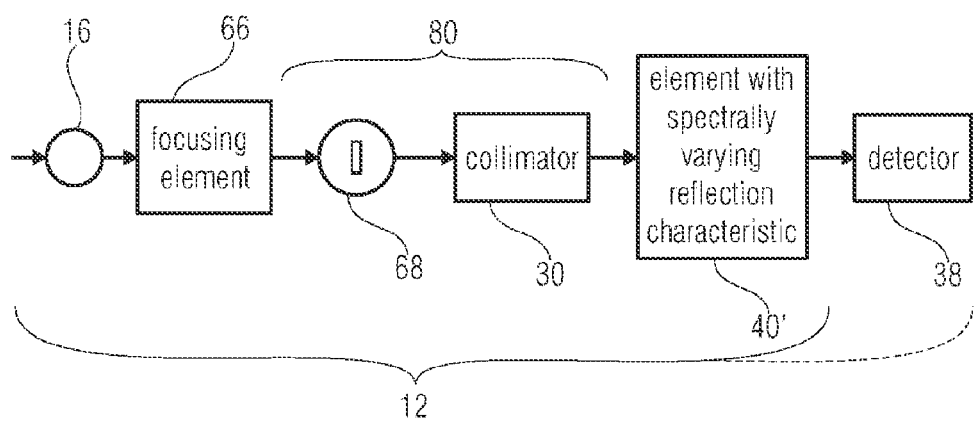

FIGS. 3b and 3c show possibilities of how the optical path 14 may be defined in the substrate stack 12, or which functional elements may be integrated in which way in the substrate stack 12. Using the description of these figures, it becomes clear that the functional element which comprises the component 60 may be a reflective entry aperture or an aperture or a beam which is implemented as a reflective entry gap, a reflective element such as a plane, concave or convex mirror, which would be part of the imaging optics, a reflective collimator which would also be part of the imaging optics, an element with a spectrally varying beam deflection angle or an element having spectrally varying reflection characteristics or a reflective focusing element. In order to illustrate this, FIG. 3 exemplarily shows a possibility for implementing the spectral decomposition device 10" with a large number of functional elements of which some may be missing, however. According to the example of FIG. 3b, in the substrate stack 12, for example, in the direction of the optical path behind one another, an optical entry opening 16, a focusing element 66, a reflective entry gap 68, a reflective element 70, a collimator 30, a reflective element 72, an element 34 having a spectrally varying beam deflection angle, a reflective element 74, a focusing element 32, a reflective exit gap 76, an imaging element 78, an optical exit opening 18 and optionally a detector 38 are formed. An example, in which the elements 70, 72, 74, 76, and 78 are missing and the exit opening 18 defines an exit aperture 36, is presented later in FIG. 13. It is indicated by a brace 80 that the optical functional element which is included in the component 60 or integrated or formed in the component 60 may be one of the functional elements 68-76 and 30-34. Just as the elements 76 and 78 may be missing, wherein the imaging functional element 78 for example imaged the reflective exit aperture 76 to the detector 38, the elements 66 and 68 may, for example, be missing, among which for example the focusing functional element 66 focused incoming beams onto the reflective entry aperture 68.

According to the alternative of FIG. 3c, in the substrate stack 12 for example an optical entry opening 16, a focusing element 66, a reflective entry aperture 68, a collimator 30, and element with a spectrally varying reflection characteristic 40' and optionally also the detector 38 are formed, among which the optical functional element 80 in this example may, for example, be the reflective entry aperture 68 or the collimator 30.

Still more precisely, the optical functional element 80 may be one of the elements indicated in FIGS. 3c and 3b by the braces, and exactly this element is then not integrated or formed in the substrate stack 12 but is introduced into the optical path 14 after forming the substrate stack 12 by mounting the component 60 with the functional element 80 to the substrate stack 12. Manufacturing fluctuations which resulted in the manufacturing of all the other elements in the substrate stack 12 may be compensated in this way as was the case with the other above-described embodiments.

Figure 4:
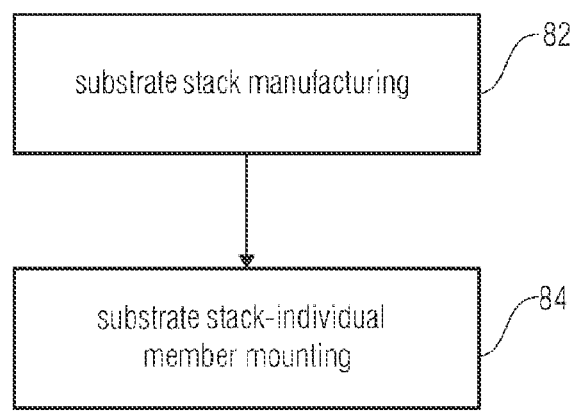
FIG. 4 shows a flowchart for manufacturing spectral decomposition devices according to one embodiment.

As is illustrated in FIG. 4, it is possible to manufacture the above-described embodiments for a spectral decomposition device by a sequence of two steps, i.e. a first step of substrate stack manufacturing 82, followed by a substrate stack-individual component mounting step 84. In the first step 82, a plurality of the substrate stacks 12 is manufactured which may, as already mentioned above, be executed on wafer level so that many substrate stacks 12 of many spectral decomposition devices may be processed parallel to each other. Alternatively, manufacturing the same may be executed on a chip level, i.e. also substrate stack-individually. The advantageous variant may depend on the number of pieces to be manufactured. The manufacturing tolerances, such as with respect to substrate thicknesses, for example, but also with respect to the lateral alignment of the substrates to each other, do not have to be set to be excessively small, as in step 84 after that the component 22, 50 and/or 60 is mounted, i.e. substrate stack-individually or even, in the case that the components 22, 50 and 60 are each present separately, opening-individually for the respective entry, intermediate and/or exit opening. In one variant it would also be possible for a component to comprise the respective optical functional element of two or all three of the above-mentioned components. Step 84 may also, for each component, be divided into an adjustment step and an actual mounting step, which will be described in the following. In particular, step 84 may be executed by adjusting the respective optical functional element of the component, i.e. by active adjustment, where an influence of the adjustment to the convolved optical path is evaluated at an exit aperture or detector zone location, i.e. the alignment is executed according to function, or by passive adjustment, where the adjustment includes an alignment regulation with regard to edges and/or corners of the substrate stack to which the component with the optical functional element is mounted.

Before specific implementation possibilities are described in the following embodiments, it is to be noted that both above and also in the following the components 22, 50 and 60 do not necessarily have to be implemented in the shape of plates. Rather, it would also be possible for the same to be implemented in the shape of a cube, cuboid or prism.

The embodiments described in the following realize the above-described possibilities regarding the shiftability of functional elements or components having several integrated functional elements, like, e.g., the optical gaps of a carrier plate, in different ways. The possibility of the relative change of position of at least two functional elements with respect to each other is important here, as has been described above.

Figure 5:
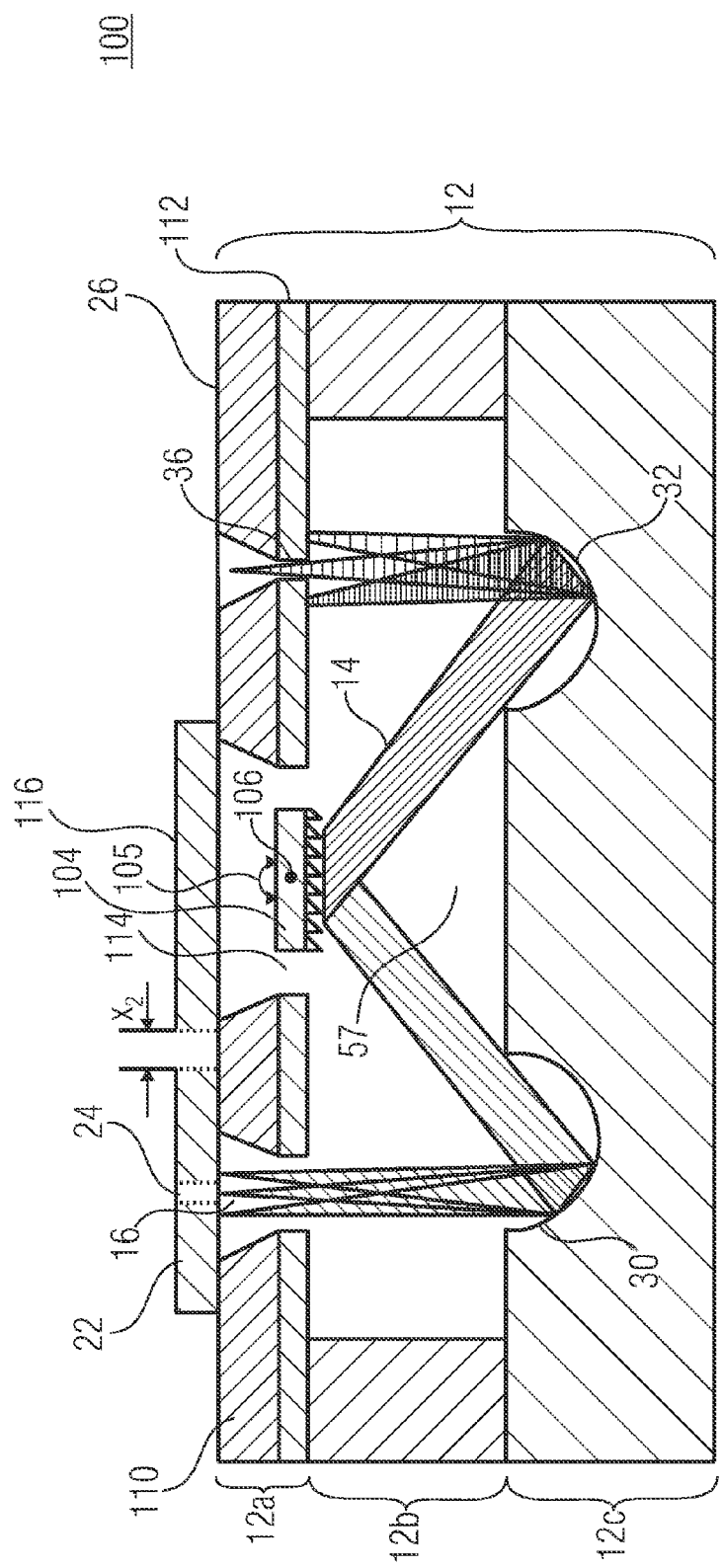
FIG. 5 shows a sectional view of a spectral decomposition device according to one embodiment.

FIG. 5 shows a miniaturized scanning spectral decomposition device having a substrate stack 12 of substrates 12a, 12b and 12c. In the substrate 12a, a window 16 for incoming electromagnetic radiation is formed. It is covered by a plate 22 which contains an optical gap 24. The window is broadened in the lateral direction opposite to the aperture 24. The substrate 12a also contains a rotatably pivoted diffraction grating 104 as an element with a spectrally varying spectral deflection angle together with an actuator or drive not illustrated in FIG. 5 for rotating 105 the diffraction grating 104 around an axis 106 which passes perpendicular to the optical path 14 and in parallel to the grating structure of the diffraction grating 104. Instead of a diffraction grating, also a phase grating may be used. The substrate 12a might be formed from an SOI substrate. As is illustrated in FIG. 5, the substrate 12a may include a carrier substrate 110 on which a layer 112 is formed. The window 16 extends through the carrier substrate 110 and the layer 112. The diffraction grating 104 is formed in the layer 112 together with the suspension 106, wherein in the grating corresponding parts of the layer 112 are removed and for enabling the rotation around the axis or suspension 106 the carrier substrate 110 includes an opening laterally at the corresponding position. In the substrate 12a, apart from that, the exit gap 36 is formed. As is illustrated in FIG. 5, the substrate 12a is mounted to the substrate 12c with the side comprising the layer 112 via the substrate 12b serving as a spacer substrate. The mounting may be executed by means of wafer bonding. A side of the substrate 12a facing away from the layer 112 thus forms the main side 26 of the spectral decomposition device 100 and the opening of the carrier substrate 110 at the location of the diffraction grating 104 may, as illustrated in FIG. 5, be covered by a corresponding cover 116 for protection against exterior influences such as dust. The plate 22 comprising the entry gap 24 covers the window 16. As is illustrated in FIG. 5, there is enough manoeuvring distance $x_2$ between the plate 22 and the cover 116.

In the substrate 12c, optical functional elements are formed, i.e. a reflective collimator 30 and a reflective focusing element 32. In the case of FIG. 5, they are both formed in the form of concave mirrors in a side of the substrate 12c facing the substrate 12a. For the reflective characteristic, either the material of the substrate 12c itself may be reflecting or a reflecting coating is applied locally or globally on the side of the substrate 12c facing the substrate 12a.

The electromagnetic radiation passing through the gap 24, as is illustrated in FIG. 5, impinges upon the reflective collimating element 30 in the substrate 12c, which is why the optical path bridges the path length defined by the spacer substrate 12b located between the substrates 12a and 12c. After a reflection at the reflective element 30, the optical path 14 leads as a parallel bundle of rays onto the pivoted diffraction grating 104, where the radiation is spectrally split and, after a further reflection at the reflective element 33, impinges upon the layer 112 in a spectrally split way with respect to its angle, where again only a selectively chosen part of the radiation may pass the exit gap 36. As has been described above, by covering the enlarged opening 16 by the plate 22 with the optical gap 24, both a change of position of the gaps 24 and 36 to each other as well as of the gap 24 with respect to the diffraction grating 104 may be realized.

The plate 22, which is integrated into the opening 24 for electromagnetic radiation, may consist, e.g., of a metal, a plastic, a glass or a ceramic material or a composite material. The opening 24 may here either be a physical opening, as is illustrated in FIG. 5, e.g. an opening 24 structured into a thin metal plate 22, or result from a selective coating of the plate 22. Thus, the opening 24 may, for example, consist of a thin glass plate provided with a layer or with a layer stack which is not transparent for electromagnetic radiation. The optical gap 24 is then only structured into the coating. This offers the advantage that, due to the continuous glass plate, the interior, i.e. the optical path space 57 of the spectral decomposition device 100 may be protected from environmental influences such as dust.

In addition to adjustment or calibration by a shifting of the gap plate 22 and the gap 24 integrated therein relative to the functional elements in the micromechanical substrate 12a, also further plates or components, as described above with reference to FIGS. 2a and 3a, the gap 36 and/or the grating 104 may be shifted with respect to the substrate 12c comprising the optical functional elements 30 and 32, by providing corresponding openings 58 or 18 in the substrate 12a.

The plate 22 comprising the optical gap 24 may, after a completed adjustment procedure, which is part of step 84, be permanently connected to the substrate 12a or the main side 26 or a common carrier using different joining processes. The adjustment processes may here be passive, i.e. be executed using suitable registration marks on the substrate and the plate, or actively after the spectral decomposition device has been put into operation or partially put into operation according to function. As joining processes, adhesive bonding, decanting, underfilling or soldering are suitable, as will be described in more detail in the following. Single or multi-component adhesive systems may be used. For the first case, for example acrylates or epoxides may be used which harden or cure by radiation energy or thermal energy or a combination of both. For the second case, manifold systems of adhesive and hardener, as well as systems of adhesive and activator may be used. Here, adhesives and hardeners or activators may be part of an adhesive mixture or composition or be present separately on the two adherents to start curing when contacting. Further, hot melt adhesives or cyanate adhesives, so-called instant adhesives or super glue may be used with a restricted temperature of use of the joining connection. The adhesive systems may be filled or unfilled. Typical fillings contain small glass or plastic beads. The fillers may here take over the function of a spacer. This joining process would also be part of step 84 of FIG. 4.

Figure 6:
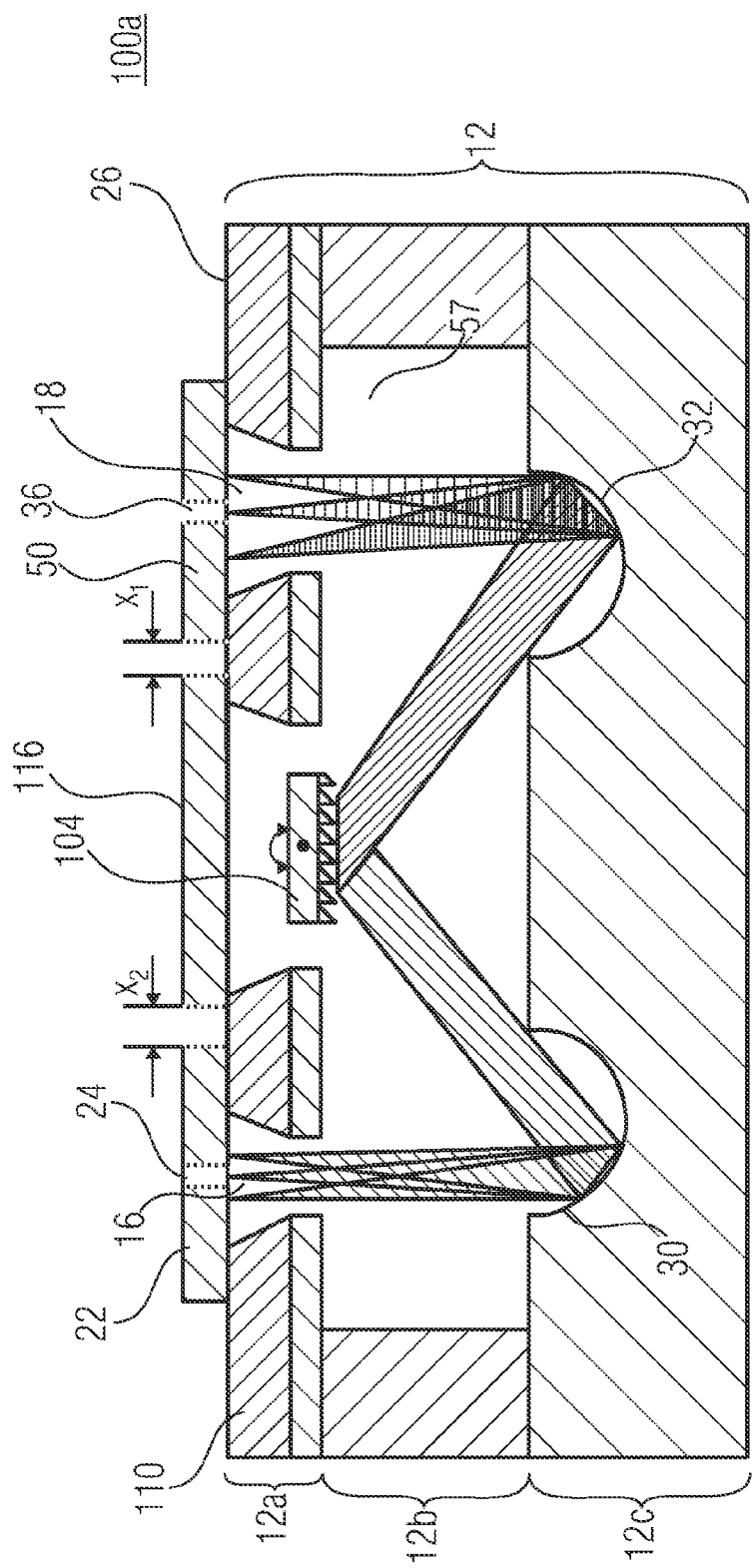
FIG. 6 shows a sectional view of a spectral decomposition device according to a further embodiment.

The miniaturized, scanning spectral decomposition device of FIG. 6 is different to that of FIG. 5, as now on the exit side an enlarged window 18 is provided as an optical exit opening in the substrate 12*a*, which is again covered by its own plate 50 with an exit gap 36 which is accordingly mounted to the main side 26 and again, adhering to a corresponding manoeuvring distance $x_1$ to the cover 116. Thus, the embodiment of FIG. 6 includes two enlarged windows 16 or 18 for incoming or outgoing radiation in the micromechanical substrate 12*a* which contains the rotatable diffraction grating 104 and its drive. By covering each of the enlarged windows 16, 18 with a gap plate 22 and 50, into which a gap 24 or 36 is integrated, as already mentioned above, a change of the position of the gaps 24, 36 to each other and also of the gaps 24, 36 to the diffraction grating 104 may be realized. In addition to adjusting or calibrating by shifting the gap plates 22, 50 and thus the integrated gaps 24, 36 to each other and to the functional element in the micromechanical substrate 12*a*, i.e. the diffraction grating 104, the gaps 24, 36 and the grating 104 may be shifted with respect to the optical component or the imaging optics formed in the substrate 12*c*. This possibility will be dealt with later on with respect to FIG. 15.

Figure 7A:
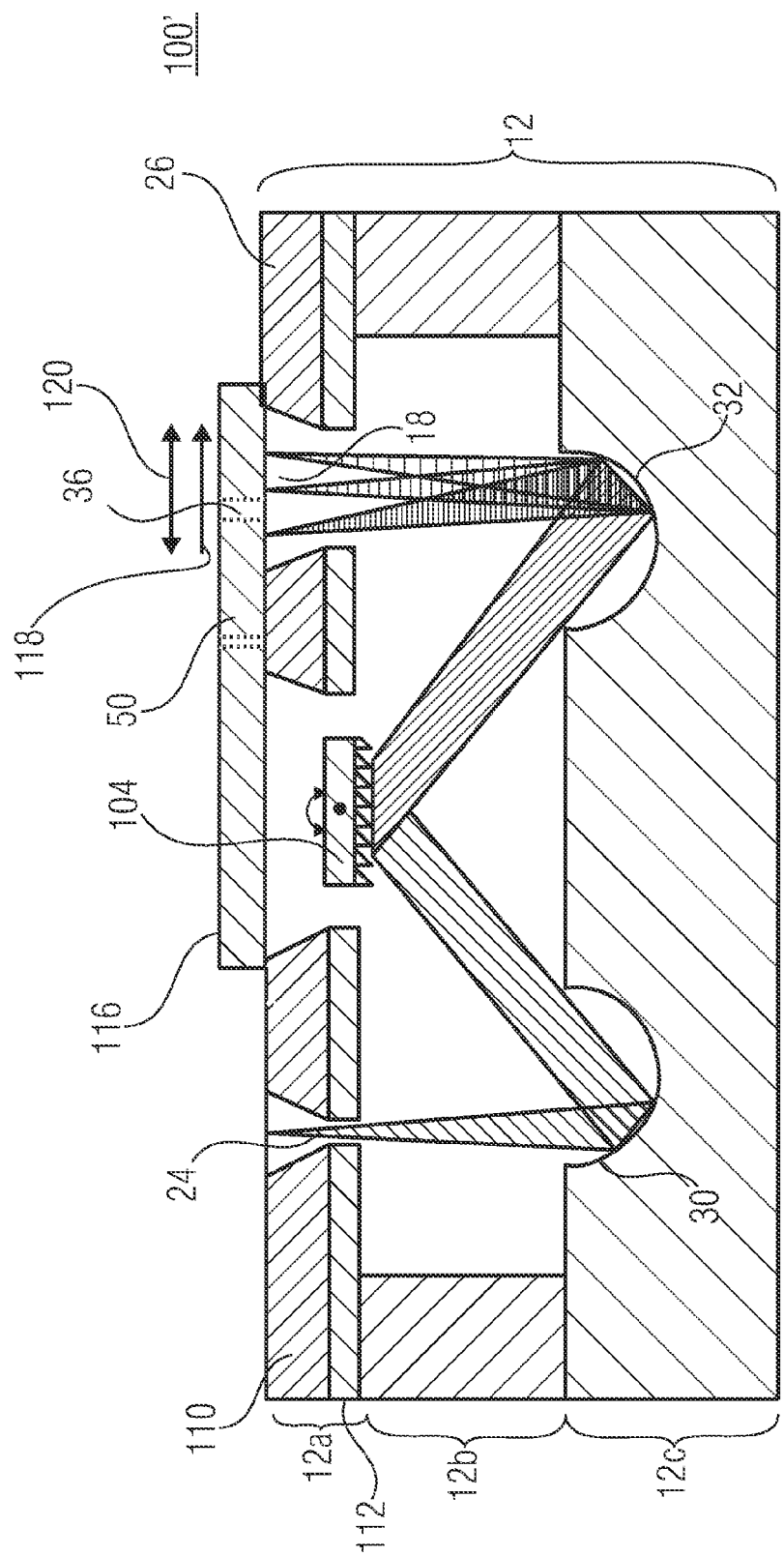
FIGS. 7a,7b show sectional images of an embodiment of a spectral decomposition device with a different position of an exit aperture component for illustrating the possibility of setting the detectable spectral range of the spectral decomposition device according to one embodiment.
Figure 7B:
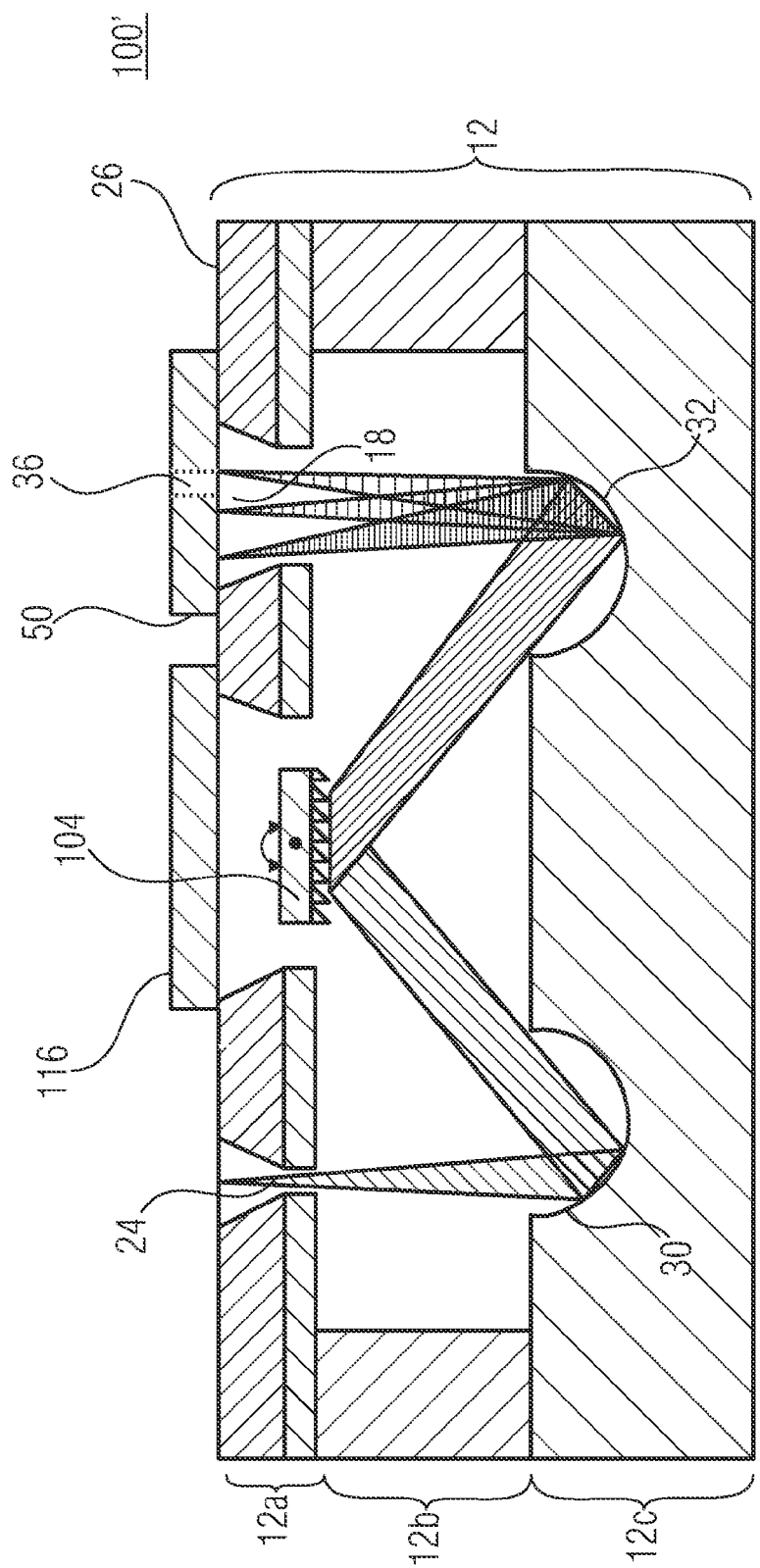

FIGS. 7*a* and 7*b* show different variants of an embodiment of a spectral decomposition device 100' which is different from those according to FIG. 5 or 6 in that the entry gap 24 is formed in the substrate 12, while on the exit side the enlarged window 18 in the substrate 12*a* is covered by the plate 50 with the exit gap 36. Also the spectral decomposition device 100' of FIGS. 7*a* and 7*b* thus includes a micromechanical substrate 12*a* which comprises a rotatably implemented diffraction grating 104, an entry gap 24 and an enlarged opening 18. A second substrate 12*c*, into which two mirrors 30 and 32 are integrated, is connected indirectly via a third substrate 12*b* acting as a spacer to the micromechanical substrate 12*a*. Through the entry gap 24, electromagnetic radiation enters the spectral decomposition device 100' and impinges upon the first minor 30 which collimates the radiation and directs it to the diffraction grating 104. Here, the radiation is spectrally split and subsequently focused from the second minor 32 into the direction of the opening 18. The plate 50 which contains the exit gap 36 is connected to the substrate 12*a* and covers the opening 18. The gap 36 thus acts as an exit gap of the arrangement. At the position of the window 18, due to the dispersive element 104, a spectrally fanned image of the entry gap 24 results which scans the exit gap 36 due to the rotational movement of the grating 104 in the splitting direction 118 in a to-and-fro movement 120. By arranging the exit gap 36, thus only a small portion of the spectral decomposition device is cut out in each case and thus spectral information is gained, whereby the spectral sensitivity range of the spectral decomposition device 100' may be set. In other words, the spectral range, defined by a minimum and a maximum wavelength of the radiation, of the spectral decomposition device 100' is, among others, determined by the maximum amplitude of the grating movement which is here a rotational movement. The diffraction grating 104 may now be implemented such that its efficiency allows a splitting of the radiation with a broader spectral range than may be scanned by the rotational movement of the grating using the exit gap. By the correct lateral position of the gap plate 50, then a predetermined partial range of the radiation spectrally decomposed by the grating may be scanned.

FIG. 7*b* shows a schematical sectional illustration of the same arrangement as in FIG. 7*a*, wherein here the gap plate 50 is located in another lateral position. Thus, with the same diffraction grating characteristic and rotational movement, the exit gap 36 lets a partially different spectral range pass during the scan movement. The great advantage of the separately arranged and mounted gap plate 36 is here, apart from compensating manufacturing tolerances, the possibility of generating a multitude of variants with comparatively little effort. Thus, with a suitable implementation of the diffraction grating 104, using the same system only by changing the gap plate position different spectrometer types may be realized which differ with respect to their spectral range. Also mounting itself needs no changes of the process. Thus, manufacturing costs may be clearly reduced.

With the above-described embodiments of FIGS. 5-7*b*, the optical functional element which was adjusted and mounted via the corresponding plates 22 or 36 was in each case a gap, but, as was described at the beginning with reference to FIGS. 1*a*-3*c*, may also consist of other optical functional elements, like, e.g., an optical detector, a reflective element, an optical element having a spectrally splitting effect or decomposing, etc. The change of position of the functional elements via the respective component or the plate may in general be executed in six degrees of freedom, i.e. three shifts and three rotations. After completed adjustment and calibration, i.e. after the functional elements of the corresponding component or the corresponding plate were aligned and/or a certain spectral characteristic was set, the functional elements or components into which the functional elements are integrated have to be fixed regarding their position, wherein adjustment and fixing are part of step 84 of FIG. 4.

Figure 8A:
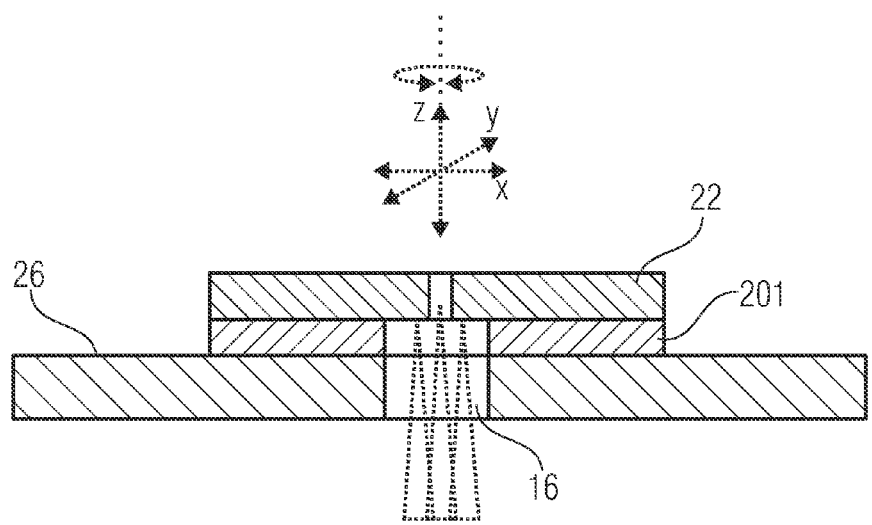
FIG. 8a shows a sectional view of mounting a component to an opening of a substrate stack according to one embodiment.
Figure 8B:
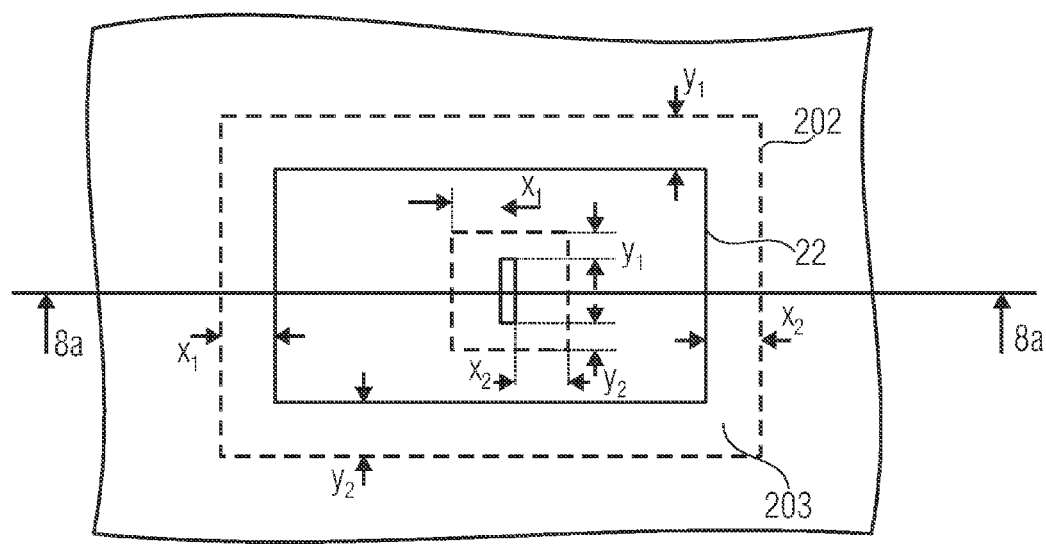
FIG. 8b shows a top view onto the mounting configuration of FIG. 8a wherein the component has been taken away for better clarity.

In the embodiment illustrated in FIG. 8*a*, fixing by adhesion with a narrow adhesive gap 201 is realized. In FIG. 8*a* instead the fixation of the component 22 at the surface 26 for covering the opening 16 is illustrated, but the embodiments with respect to FIG. 8*a* and also the following embodiments with respect to FIGS. 8*b*-12 also apply, of course, for the components or elements 50 and 60 with respect to the openings 18 and 58. When adjusting, the component 22 to be fixed may be laterally shifted or moved translationally in the x and y planes in two degrees of freedom and may be rotated around the perpendicular z axis. In this respect, the above-mentioned manoeuvring distance is provided. In other words, the main side 26 is shaped such that in an overlying or virtually overlying state, on the main side 26, of the component 22, a translational movement during adjustment by $x_1+x_2$ along the x axis and $y_1+y_2$ along the y axis is possible, as is indicated by the dashed line 202, wherein the translational movement only then abuts, for example, on a protrusion of the main side 26, which is why after adjustment and fixation, i.e. in the assembled state, also a gap 203 with respect to such possibly existing protrusions would remain. $x_1+x_2$ and $y_1+y_2$ are, for example, larger than 2 μm.

In addition, a fixation of the shift in the axis perpendicular to the plane of the components, i.e. the xy plane, i.e. the z axis, is possible in the size of the adhesive gap thickness. Shifting perpendicular to the device plane elongates or shortens the optical path for compensating a corresponding thickness variation of, for example, the spacer substrate 12b. The possibility of adjustment in this degree of freedom is thus especially advantageous as in this way thickness tolerances of the substrate may be compensated and the focus of the system, like, e.g., the focus of the above-mentioned imaging optics and in particular of the collimator of the focusing optics 32 may be set. In this way, it is prevented that the substrates involved have to be very tightly tolerated regarding their thicknesses, in particular the spacer.

During the adjustment, the adhesive is not yet cured, for example. The distance to the area 26 is changed, for example, by changing a contact pressure during the adjustment. A fixation is then achieved, for example, by curing the adhesive or the adhesive agent. Examples of possible adhesives are given in the following.

Figure 9:
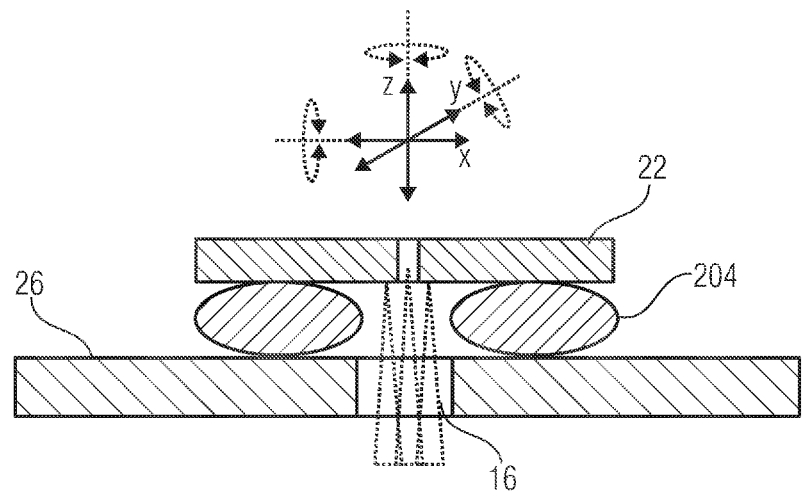
FIG. 9 shows a sectional view of a mounting of a component to an opening of a substrate stack according to a further embodiment.

The fixation of the component 22 is, in the embodiment of FIG. 9, realized by underfilling 204 with a suitable medium and a higher layer thickness than in adhesive bonding. Here, the respective component 22 may be shifted in three degrees of freedom and/or be rotated around three spatial directions. Shifting perpendicular to the device plane, i.e. the xy plane, i.e. in the z direction, elongates or shortens the optical path, as was described above. Adjustment and curing may again be decoupled.

Figure 10:
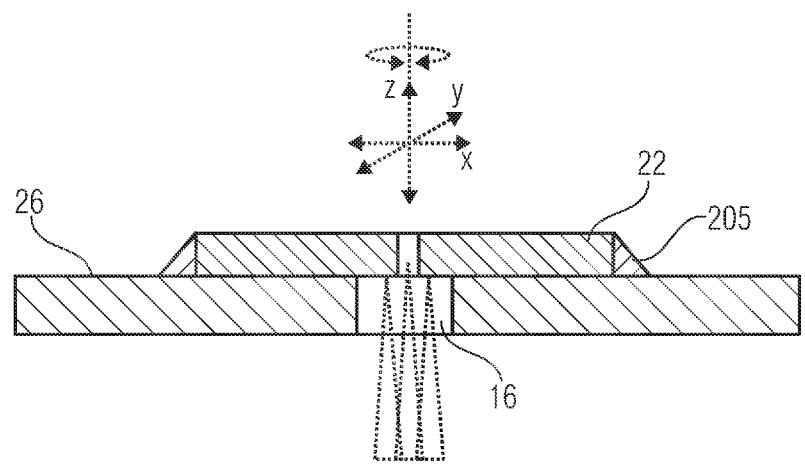
FIG. 10 shows a sectional view of a mounting of a component to an opening of a substrate stack according to a further embodiment.

According to the embodiment illustrated in FIG. 10, the fixation of the component 22 is realized by refilling or edge adhesive bonding 205 using a suitable medium. Here, the component to be fixed may be shifted within the device plane, i.e. the xy plane, in two degrees of freedom and be rotated around the perpendicular axis, i.e. the z axis.

Figure 11A:
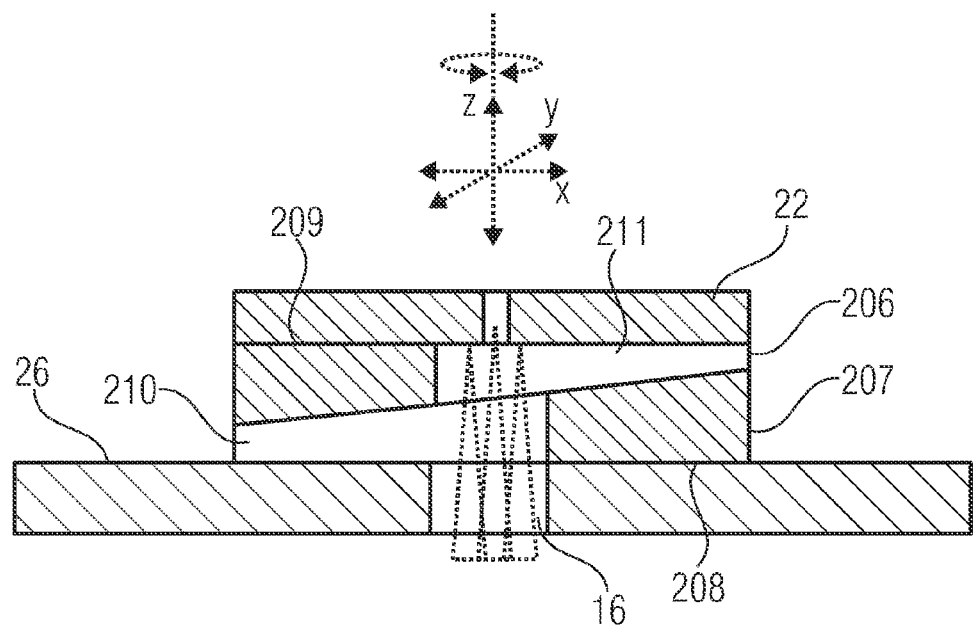
FIG. 11a shows a sectional view of a mounting of a component to an opening of a substrate stack according to a further embodiment.
Figure 11B:
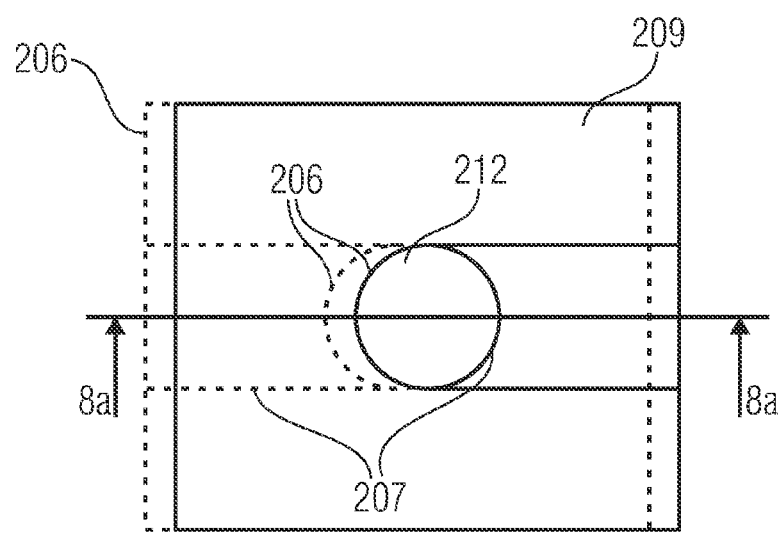

According to FIGS. 11a and 11b, the fixation of the component 22 to the main side 26 or the substrate stack is thus made adjustable by around four degrees of freedom, also using otherwise thin-layered adhesive bonding connections, by using at least two wedge-shaped components 206 and 207. As is illustrated in FIGS. 11a and 11b, the wedge-shaped components may, for example, have a wedge-shaped cross-section and be joined to each other such that their opposing sides 208 and 209 are parallel or virtually parallel to each other. Arranged in such a way, they are positioned between the component 22 to be fixed and the main side 26. Apart from that, in the thickness direction, the components 206 and 207 have continuous openings 210 and 211 which are advantageously longitudinal regarding the direction in which the wedge-shaped height profile of the components 206 and 207 has the largest inclination, which exemplarily corresponds to the x direction in FIGS. 11a and 11b. By shifting the two wedge-shaped substrate-shaped components 206 and 207 with respect to each other, a large translational shifting of the component 22 to be fixed perpendicular to the device plane, i.e. the xy plane, along the z axis, i.e. the normal direction to the side 26, may be achieved. In FIG. 11b, for example by dashed lines, such a mutual shifting of the components 206 and 207 along the x direction relative to each other is indicated which causes a reduction of the distance between the opposing sides 208 and 209 or the component 22 and the mounting surface or main side 26. The remaining degrees of freedom in adjustment, i.e. the two shifts of the component 22 in the x and y directions and the rotation around the z axis are analog to the embodiments of FIG. 8 or 10. In FIG. 11b, the overlap of the openings 210 and 211 is illustrated, wherein the overlapping region 212 when fixing is aligned laterally to the opening 16 to be covered, so that the overlapping region overlaps also with the opening to be covered. On the thus defined plane 209, the component 22 is adjusted and fixed in the above-described remaining three degrees of freedom. Shifting along the z axis by shifting the two components 206 and 207 with respect to each other elongates or shortens the optical path, as was already described above, and joining the components 22, 206 and 207 may generally be executed by pasting over and/or refilling.

Depending on the manufacturing tolerance and the desired number of degrees of freedom in adjusting and calibration, the advantages of one of the possibilities according to FIGS. 8-11b may be utilized. Curing the adhesive, underfilling or refilling may be executed physically or chemically, for example by radiation energy or thermal energy, depending on the medium used. The possibility of curing or hardening using a combinatorial curing mechanism of optical and thermal energy input or yield is of special importance. The components may, in this way, be fixed very fast, and the covered areas, and the complete connection, may subsequently be cured or trough-hardened. If alignment is also possible before a contact of the second joining partner with the joining medium, contact adhesives or super glues, whose advantage is the direct fixing of the predefined final position, may be used. Joining methods which are almost without distortion and quickly join at a defined point in time or in a define period of time are advantageous.

In the embodiment, the wedge plates may be covered laterally, but mainly at positions of the longitudinal openings which do not contribute to the aperture overlap, with a casting compound or the like, in order to prevent, in this way, the penetration of foreign radiation through such parasitic openings.

Figure 12:
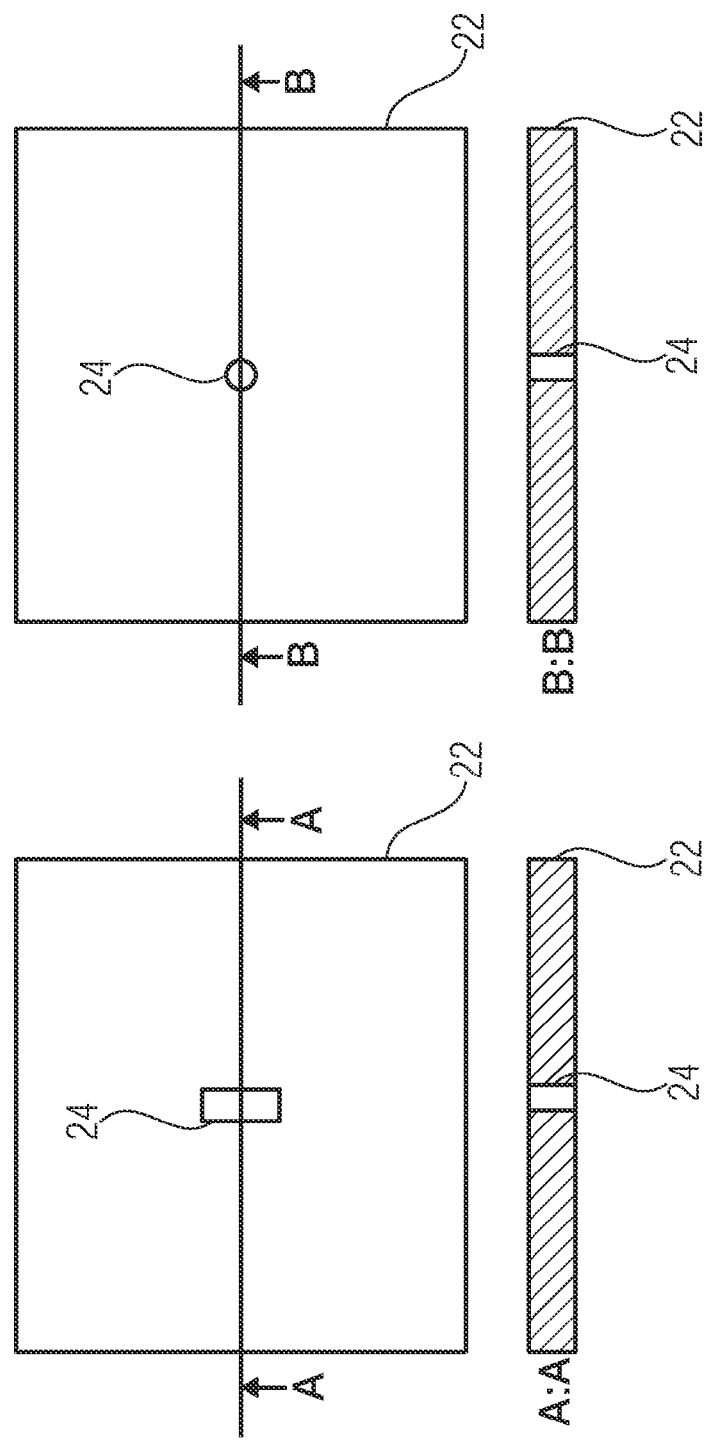

For the sake of completeness, FIG. 12 shows different embodiments for a component with an aperture, like, e.g., the component 22 and the aperture 24, wherein the examples may, of course, also be used for the component 50 and the aperture 36. As may be seen, the aperture may be gap-shaped or dot-shaped. The component 22 may be plate-shaped, wherein the plate may be selected in the form of a square, as is exemplarily illustrated in FIG. 12, or in any other form, like, e.g., in the form of a circle or the like.

Figure 13:
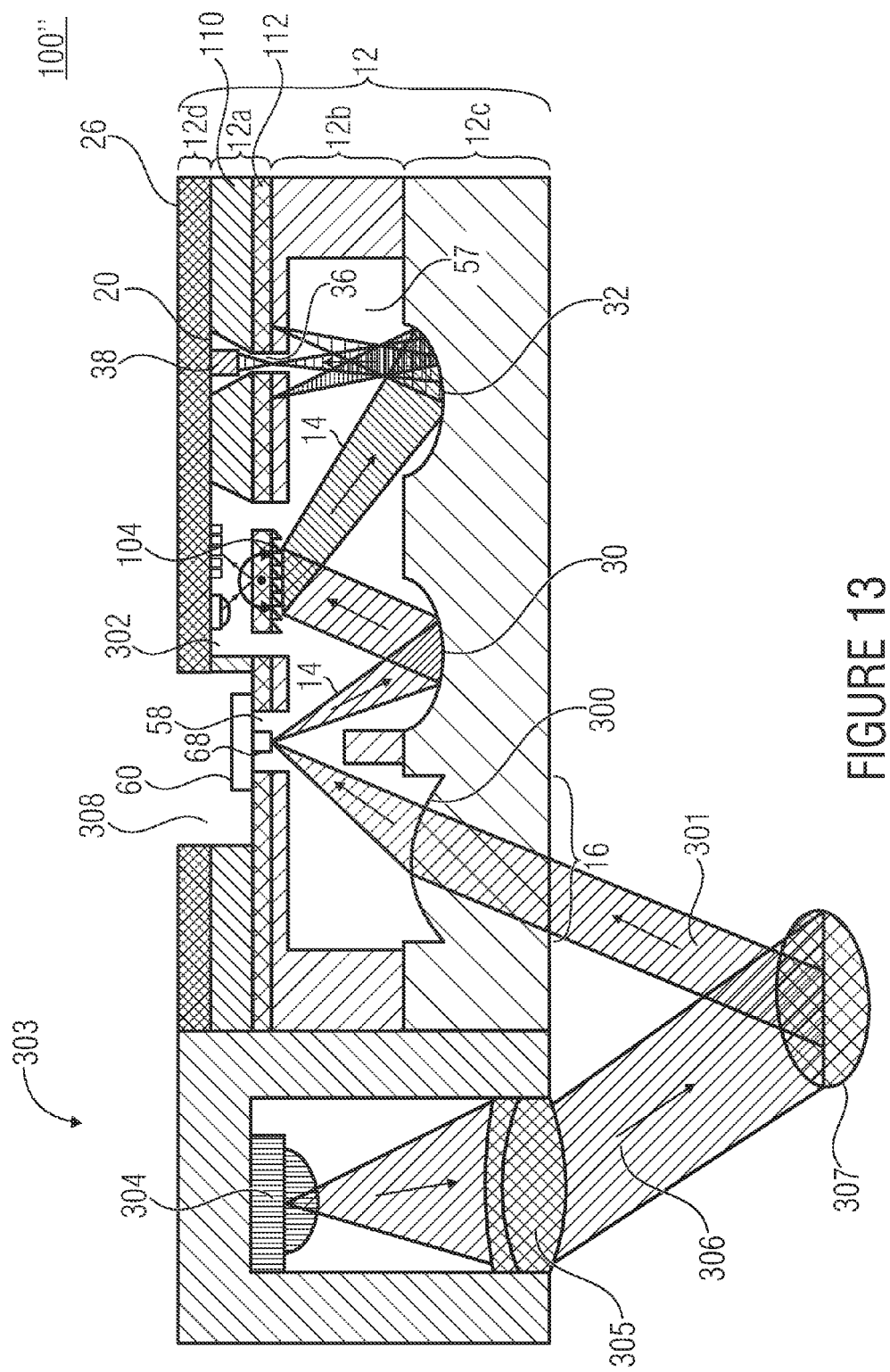
FIG. 13 shows a sectional view of a spectrometer according to a further embodiment.

FIG. 13 shows an embodiment of a spectrometer 100" which comprises a substrate stack 12 with a micromechanical substrate 12a, an optical substrate 12c, a spacer substrate 12b between same, and another additional substrate 12d on the side of the substrate 12a facing away from the substrate 12c. In contrast to the above embodiments, with the spectrometer 100", the optical entry window 16 is formed in the optical substrate 12c. Directly at the entry window, adjacent to the optical path space 27, a collimator 300 is located for bundling a bundle of rays 301 which arrives in parallel onto a reflective entry aperture 68. Further, laterally beside the same, the optical substrate 12c includes a collimator 30 and a focusing element 32 which are both implemented as concave mirrors. In the micromechanical substrate 12a, just like in the preceding embodiments, a rotatably suspended diffraction grating 104 and an exit aperture 36 are formed. The substrate 12d covers the side of the micromechanical substrate 12a facing away from the layer 112 in which the suspension and the diffraction grating 104 are formed, and additionally carries a sensor 302 for detecting the rotational angle position of the diffraction grating 104 and a detector 36 which is thus arranged at a detector zone 20 of the spectrometer 100", so that the detector 36 detects the radiation which passes the exit gap 36. As is illustrated in FIG. 13, laterally to the substrate stack 12, also an illumination device 303 with a light source 304 and condenser optics 305 may be mounted to irradiate an object 307 to be examined by illumination radiation 306. The examination radiation 301 which passes the entry window 16 may, for example, be fluorescence radiation which originates from the object 307. In the direction of the optical path of the optical path 14 of the spectrometer 100" forming in the optical path space 57, the above-mentioned functional elements are located in the following order: collimator 300, reflective entry gap 68, collimator 30, diffraction grating 104, focusing element 32, exit gap 36, detector 38.

In a similar way to that illustrated exemplarily in FIG. 1d, the main side 26, i.e. the side of the substrate stack 12 facing away from the optical substrate 12c, comprises a recess 308 formed by a corresponding opening in the substrates 12b and 12a. In this recess 308, the optical path space 57 opens in an intermediate opening 58 and at the bottom of this recess which forms a level portion of the main side 26 around the opening 58, a component 60 comprising the reflective entry aperture 68 is adjusted and mounted to compensate for manufacturing tolerances in the manufacturing of the substrate stack 12, as was described above.

Figure 14:
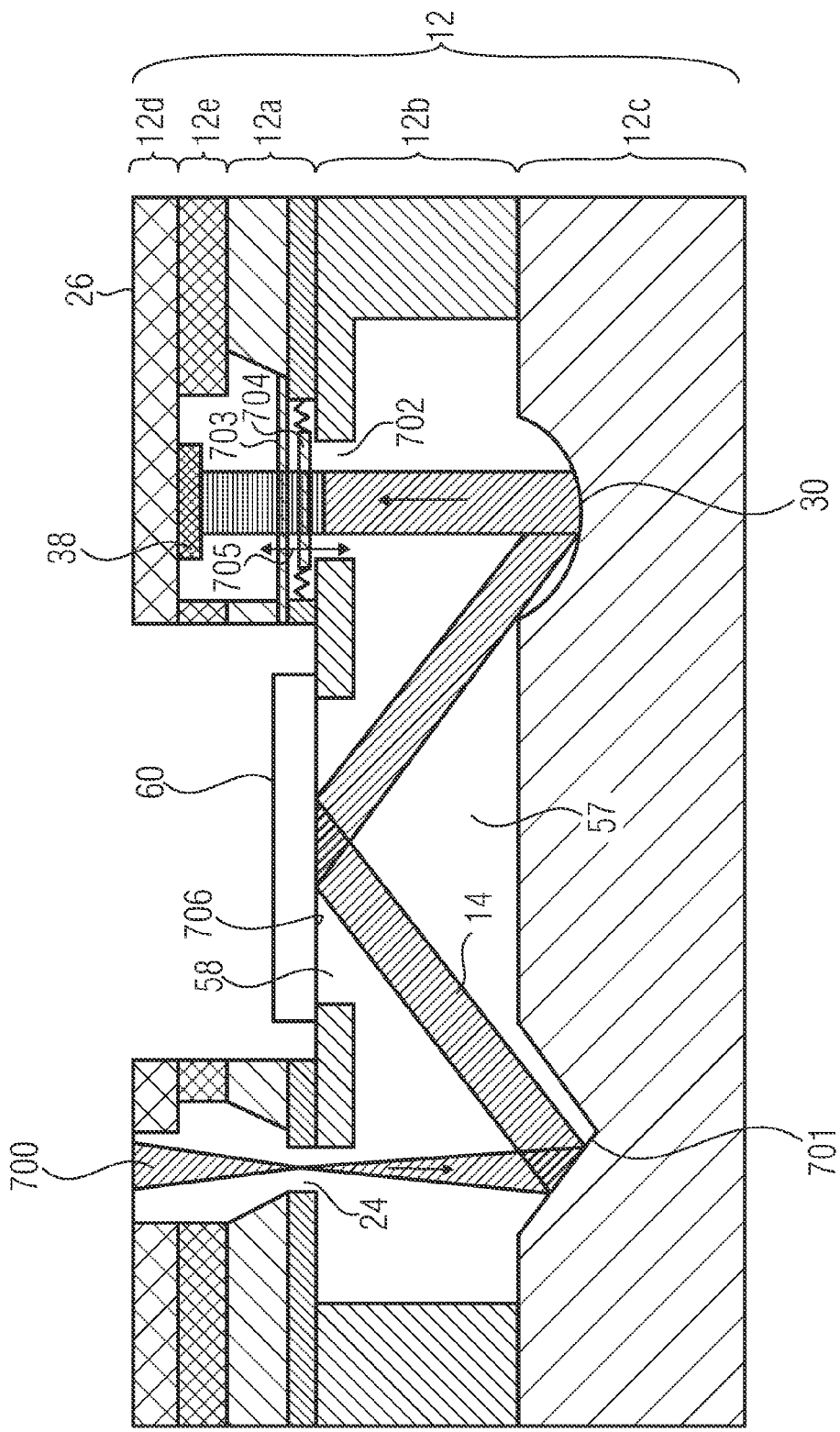
FIG. 14 shows a sectional view of a spectrometer according to a further embodiment.

FIG. 14 shows a further embodiment of a spectrometer. In this spectrometer, the substrate stack 12 exemplarily includes five substrates, i.e. stacked onto each other in the mentioned order an optical substrate 12c, a spacer substrate 12b, a micromechanical substrate 12a, a spacer substrate 12e and a microelectronic substrate 12d. The spacer substrate 12b is arranged between the micromechanical substrate 12a and the optical substrate 12c and using the same defines the optical path space 57. In the micromechanical substrate 12a, the entry aperture is defined, into which incoming light 700 may enter via corresponding openings in the substrates 12d and 12e located above the same. In the optical substrate 12c, a deflecting minor 701 and a collimator 30 are formed. The micromechanical substrate 12a further includes a fine-tunable micromechanical filter 702 as an example of an element having a spectrally varying transmission characteristic. Two optically transmissive plates 703 and 704 which are part of the filter 702 extend laterally in the micromechanical substrate 12a in parallel to each other, wherein one (704) of the same may be set into vibration 705 in the direction of thickness by an actuator in order to temporarily vary the distance between the plates 703 and 704 and thus the transmission characteristic. The detector 38 is carried by the substrate 12b or is formed at or in the same in order to detect the radiation transmitted by the filter 702. The substrate stack 12 includes an intermediate opening 58 where the optical path space 57 opens or is optically accessible, and this opening 58 (or this window) is covered by an adjusted component 60 having an optical functional element, i.e. a minor 706, wherein the component is also mounted to the corresponding main side 26, at the side facing the optical path space 57. In the direction of the optical path of the optical path 14, the entry gap 24, the deflection mirror 701, the deflection minor 706, the collimator 30, the filter 702 and the detector 38 are connected in series in the mentioned order. Again it is possible, by adjusting and mounting the component 60 and thus the minor 706, to compensate deviations in the manufacturing of the substrate stack 12.

In the embodiments described above, it was the case that a substrate stack was first of all manufactured, wherein in the manufacturing the manufacturing tolerances could be selected relatively generously, whereupon a substrate stack-individual component mounting was executed in which a missing optical functional element was installed later. According to the subsequently described embodiments, an improvement of manufacturability is achieved by the substrate stack not being manufactured completely on wafer level, but substrate stack-individually.

Figure 15:
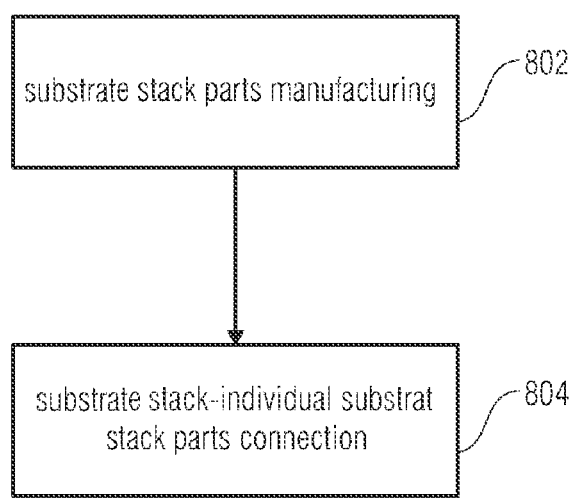
FIG. 15 shows a flowchart for manufacturing spectral decomposition devices according to a further embodiment.

FIG. 15 shows the steps of manufacturing according to one embodiment. As is illustrated, first of all in a step 802, manufacturing of substrate stack parts is executed. In this manufacturing step, a plurality of otherwise complete substrate stacks is first of all manufactured in parts, wherein for each substrate stack each part comprises a disjunct amount of substrates of the respective substrate stack and the same may be combined into the respective substrate stack. According to one variant, here one or several parts of the substrate stack may be provided with components, as was already indicated above with respect to FIG. 6. Here, for example, in the wafer assembly or on wafer level, already that part with the substrates 12c and 12b may have been manufactured, and separately, maybe also on wafer level, a substrate 12a with the element 104 and a further substrate with gaps 24 and 36. All three manufacturing steps would be part of step 802. The substrate 12a and the additional substrate may be manufactured on wafer level. At any rate, the manufacturing in step 802 is executed such that an optical entry aperture and/or an optical exit aperture is formed in a substrate stack part of a respective substrate stack in which neither the optical functional element having a spectrally decomposing effect, nor the imaging optics is formed. In this way, an additional adjustment possibility is achieved which will be described in the following with reference to FIG. 16. Instead of the manufacturing on wafer level, of course also the manufacturing on chip level would be possible, i.e. in a separate form or spectral decomposition device-individually.

In a subsequent step 804, then a substrate stack-individual substrate stack part connection is executed. I.e., the parts which were manufactured in step 802 are then connected to each other or mounted to each other in order to result in the final substrate stack. This step 804 is then not executed on wafer level, however, but substrate stack-individually. This again means that at least one of the substrate stack parts to be connected to each other has to be diced or separated, wherein this is advantageously the above-mentioned additional substrate stack part comprising the entry and/or exit gap. In the example mentioned above, which will be explained in more detail in the following with reference to FIG. 16, it may, for example, be the case that a substrate with gaps 24 and/or 36 was diced or separated. A dicing of several parts is, of course, also possible. In this state, the parts are then connected to each other so that it is possible to compensate for height fluctuations or thickness fluctuations of the substrates of the individual stacks stack-individually.

FIG. 16 again shows an embodiment of a spectral decomposition device which was manufactured according to the method of FIG. 15. In this spectral decomposition device, the substrate stack 12 includes, for example, a first part of two substrates, i.e. an optical substrate 12c and a spacer substrate 12b, wherein in the optical substrate 12c here exemplarily a collimator 30 and a focusing element 32 are implemented as concave mirrors. A further part includes the substrates 12a and 12d. The substrate 12a is a micromechanical substrate and includes the diffraction grating mirror 104 which is pivoted as already known from the above embodiment. The micromechanical substrate 12a has in step 802 already been connected partially to the substrate 12d, wherein in the latter again the entry gap and the exit gap 36 are formed. The micromechanical substrate 12a is here structured such that it does not cover the entry gaps 24 and 36 and that it fits into the optical path space 57 which results in the subsequent substrate stack-individual substrate stack parts connection 804, when the substrate stack part consisting of the substrates 12a and 12d comprising the micromechanical substrate 12a, facing the optical substrate 12c, is mounted to the other part consisting of the substrates 12c and 12b.

Figure 16:
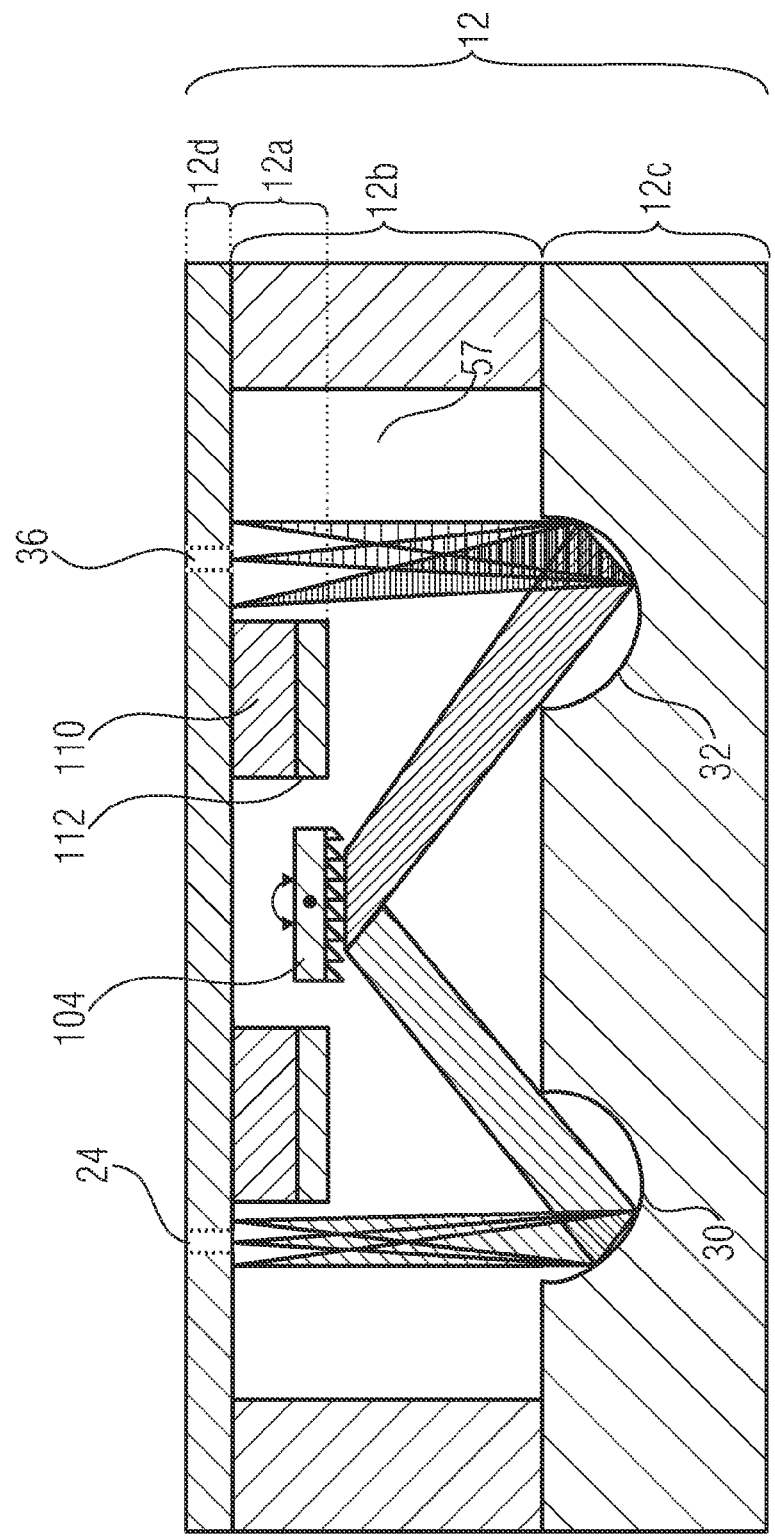
FIG. 16 shows a sectional view of a spectral decomposition device according to a further embodiment.

In the embodiment of FIG. 16, the spectral decomposition device has thus been extended by a separate micromechanical substrate 12a which contains the rotatable diffraction grating 104 and its drive. The same is arranged in step 102 on the substrate 12d, around which the two gaps 24 and 36 are integrated, whereby a change of position of the gaps 24, 36 relative to the diffraction grating 104 may be realized. The gaps are here fixed in position with respect to each other. In addition to adjusting or calibration by shifting the optical substrate 12d, the two gaps 24, 36 and the grating 104 may be shifted in step 804 with respect to the optical substrate 12c which contains the optical functional elements, like, e.g., the two concave mirrors 30, 32.

In other words, according to FIG. 16, a first substrate stack part includes the optical substrate 12c in which one or several reflecting zones are implemented in order to form a collimator and a focusing element, and a second substrate stack part comprises a carrier substrate 12d which carries a rotatably mounted grating on one of its main sides and in which the entry aperture and/or the exit aperture is formed, wherein the subsequent substrate stack-individual connecting is executed such that the first substrate stack part is connected to the second substrate stack part by connecting the carrier substrate 12d to the optical substrate 12c, whereupon the rotatably mounted grating 104 is located in an optical path space 57 which is defined by the first and second substrate stack parts.

It is to be noted that the substrate stack structure of FIG. 16 may easily serve as a substrate stack manufactured in step 82, when instead of one or both gaps 24 and 36 in the substrate 12d corresponding windows 16 or 18 are provided at each of which then in step 84 one component 22 or 50 is mounted. The substrate stack thus formed the mentioned optical path in the interior, i.e. with the micromechanical component including the elements 110, 112, 104 in the interior.

Figure 17:
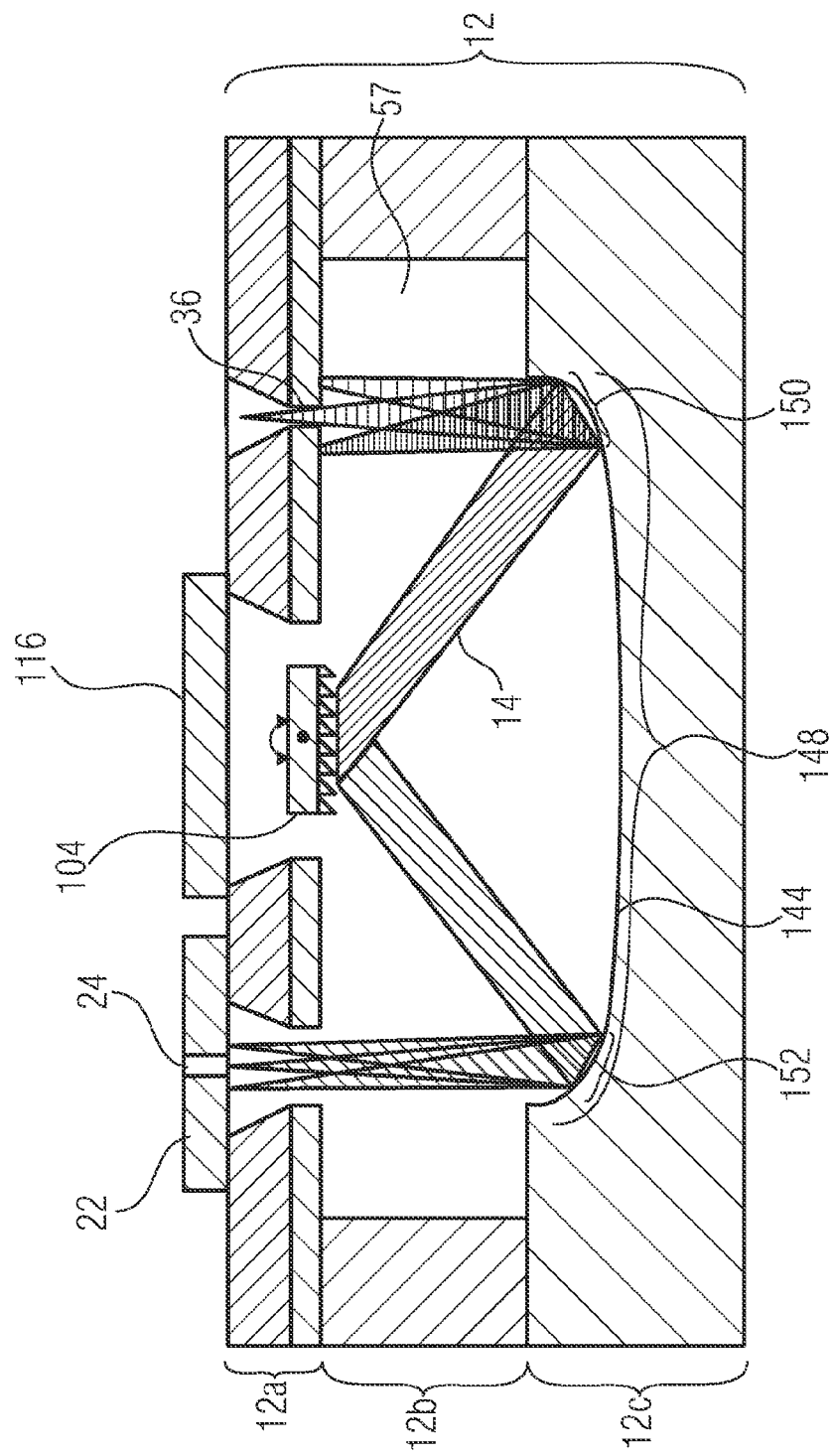
FIG. 17 shows a sectional view of a spectral decomposition device according to a further embodiment.

FIGS. 17 and 18 exemplarily show that it is possible to modify the above embodiments, like, e.g., here exemplarily the embodiment of FIG. 5, so that the imaging optics, instead of two indentations in a substrate 12c for forming corresponding concave minors 30 or 32, only comprises only one indentation 144 or recess. The latter may, for example, across a simply connected convex area portion 148 of the indentation surface completely including the sections 150 and 152 at which the beams of the optical path are reflected—here exemplarily a section 150 for the beams in the optical path direction before the element 104 having a spectrally decomposing effect, and a further section 152 for the beams in the optical path direction behind the element 104 having a spectrally decomposing effect—comprise no change of sign of the Gaussian curvature. In other words, the area portion 148 may define a continuously concave section of the corresponding substrate 12c. The sections 150 and 152 may—as exemplarily the case in FIGS. 17 and 18—not be arranged in an overlapping way, but a partial overlap would also be possible. Advantageously, the area portion or amount of space 148 in the two sections 150 and 152 comprises a different geometry, for example having a different lateral variation of the main curvatures. In contrast to FIG. 17, in the example of FIG. 18 the grating 104 is exemplarily implemented such that beams impinging upon the grating 104 impinge at an angle of incidence with respect to a grating plane of the grating 104 which is different with regard to its amount from an output angle with respect to the grating plane in which the reflected and interfering beams leave the grating 104, and may even be different regarding the sign, so that the entry gap 24 and the exit gap 36 are positioned on the same side relative to the grating 104—here exemplarily with the exit gap 36 between the entry gap 24 and the grating 36—just like the indentation or recess 144.

The above embodiments are thus suitable for an integration into spectroscopic instruments or spectral devices. Spectral devices and in particular spectrometers are today among other things used for manifold analysis purposes. Here, a sample to be examined is irradiated by electromagnetic radiation of a known spectral composition. This radiation may interact in different ways with the atoms or molecules of the sample, like, e.g., by absorption or fluorescence, wherein an example of the latter form of analysis was illustrated in FIG. 13. The radiation passing the sample or originating from the same or reflected by the same is then decomposed by one of the above-described spectrometers or spectral decomposition devices in a suitable way into its spectral components and registered by a detector or a matrix arrangement of detectors. From the thus gained spectral information, a conclusion may then be made with respect to the composition of the sample, for example.

The above embodiments were partially allocated to the group of scanning grating spectrometers. In these devices, the electromagnetic radiation is directed through an entry gap and a collimator minor onto a two-dimensionally extended, rotatably implemented diffraction grating. The radiation split spectrally by the grating is subsequently focused by a further minor onto an exit gap. Behind the same, a detector for measuring the electromagnetic radiation may be arranged. With a certain deflecting position of the grating, the exit gap selects a narrow wavelength range of the spectrum, as was described above. By rotating the grating, the split portions of the spectrum scan the gap and are thus registered by the detector one after the other.

The above embodiments thus represent advantageous variants of implementations of a miniaturized scanning grating spectrometer and methods for a simplified adjustment, calibration and mounting of the same. The above embodiments here solve two objects which could hitherto not be solved in the manufacturing of spectrometers. First of all, after a completed pre-mounting of an integrated spectrometer (stacked setup of different substrates) in a subsequent adjustment procedure manufacturing and assembly tolerances may be compensated. Secondly, after the completed pre-mounting, wavelength ranges may be selected within certain boundaries and a calibration of the device to a desired spectral characteristic may be executed.

The above-described embodiments further included suitable methods for continuously maintaining a generated adjustment state or a spectral selection or characteristic after adjustment or calibration by fixing shiftable functional elements or building groups. By the above embodiments, in a final assembly or mounting process, manufacturing tolerances may be compensated and/or by a final selection process, a variety of variants may be generated and the generated state may be fixed. The shifting of the adjustment or calibration into a subsequent step of manufacturing basically leads to a reduction/simplification of the adjustment or calibration effort. The generation of a multitude of variants for the spectral device may then only be achieved by a change of position of individual functional elements or building groups, like, e.g., entry or exit gaps and without the use of variant-specific components.

The above embodiments thus overcome the earlier restrictions with respect to adjustment and calibration in the stacking of substrates for generating a spectral decomposition device, in particular in stacking direction of the substrates. They overcome the stronger influence of manufacturing tolerances resulting from this restriction. This is enabled by well-defined final adjustment and mounting steps of suitable optical/mechanical functional elements, like, e.g., gaps which are not necessarily integrated into one of the substrates. The above embodiments may thus achieve a loosening of manufacturing tolerances and achieve a cost reduction.

Some of the above-described embodiments distinguish themselves by the fact that functional elements or building groups of integrated functional elements, like, e.g., gaps, may be shifted relative to one another which offers suitable adjustment or calibration possibilities or simplifies the same.

By the functional elements or building groups available relative to one another, within certain limits a variety of variants may be generated for this type of special apparatus which was hitherto mainly only possible by the use of variant-specific components. Thus, a further advantage of manufacturing and, thus, economy results. The manufacturing of subtypes becomes possible merely by changes in the sequence of assembly. The type and number of mounting steps and the functional or building elements may be maintained. The above embodiments thus partially enable an increased flexibility with respect to known procedures.

Some of the above-described embodiments for miniaturized, integrated spectral decomposition devices on the basis of micromechanical functional elements, which partially are pivotable diffraction gratings, may, for example, be manufactured in silicon technology. As has been described above, the same substrate containing the micromechanical functional element may comprise one or two windows which may form the entry window or an exit window. These windows result simultaneously, i.e. with the same process steps with the micromechanical functional element and are thus stationary with respect to the same. In the mounting process, the different substrates are then put onto each other, from which the spectral decomposition device is set up. For preventing adjustment or calibration problems during the mounting process, which may result from the tight manufacturing tolerances and reduced degrees of freedom when aligning, the entry and exit windows are not defined so tightly as to act as an aperture to begin with. The openings for coupling in and out of the electromagnetic radiation, i.e. entry and exit gaps, are mounted with additional mechanical functional elements separately to or onto the micromechanical substrate or a common carrier. These additional mechanical functional elements are only mounted to the other substrates after assembly. By this, a assembly or mounting order is enabled in which the gaps may be aligned into four degrees of freedom before a final mechanical fixing and thus also a position relative to the other functional elements is executed. Fixing the adjusted or calibrated functional elements may here, for example, be done by adhesive bonding, wrapping, underfilling or soldering. The micromechanical substrate comprising the rotatable diffraction grating then has to comprise accordingly larger openings at the locations in which the gaps are positioned or placed. By this, a greater freedom for adjustment or calibration results, as has been described above.

By the positioning of the functional elements, the position of one or several images within the spectral decomposition device may be influenced. The position of the images determines the occurring angles at the optical grating and thus the spectral characteristic of the spectral decomposition device. The adjustment or calibration is not only executed by the relative shifting of one or several functional elements, which is why the type and number of components and mounting steps may remain unchanged.

In addition to the above embodiments, it is also to be noted that the above embodiments may be applied to different known spectrometer principles, such as those which are realized by the use of micromechanical components which enable a modulation of electromagnetic radiation, wherein the modulator may change the radiation with respect to the angular spectrum, the local radiation distribution, the combination of the wavelength spectrum, the polarization state or a combination of the same. Thus, for example, grid spectrometers according to the Czerny-Turner principle, transformation spectrometers, classical Fourier transformation spectrometers (Michelson interferometers), Hadarmard transformation spectrometers or spectrometers comprising a tunable filter, for example a Fabry-Perot interferometer or an acousto or electro-optical modulator or liquid crystals may be realized. Further, the spectrometer module, depending on the positioned radiation source or illumination source, may be used for the spectroscopy in the ultraviolet wavelength range (UV), in the visible wavelength range (VIS), in the near infrared wavelength range (NI'R) and in the infrared wavelength range (IR) and for Raman spectroscopy and/or for fluorescence spectroscopy.

Further, with the above embodiments, functional elements which may be manufactured in the same technology and in or on the same substrate materials are advantageously integrated each in or on a respective substrate. Thus, in the above embodiments, also on the optical substrate 12c advantageously—and possibly exclusively—optical elements were integrated, such as, for example, for beam formation, beam direction, beam separation, filtering (locally, spatially and/or spectrally) and/or for spectrally splitting electromagnetic radiation. On the micromechanical substrate 12a, advantageously—and possibly exclusively—micromechanical elements or passive elements are integrated, like, e.g., gratings, diffractive optical elements or photonic crystals, In a corresponding lithographic technology, like, e.g., in silicon micromechanics on an SOI wafer, for modulation, deflection and/or for spectrally splitting electromagnetic radiation, and apertures for local and/or spatial filtering. The surfaces are advantageously provided with a reflecting layer, like, for example, aluminum, silver, gold and/or AlMgSi, but may also be provided with a layer stack.

The above-mentioned spacer substrate 12b, which may also be referred to as a spacer, mainly contains, as described above, openings so that optical radiation between the optical substrate and/or the micromechanical substrate or other substrates may form. The spacer thus partially also has the task of minimizing scattered light and/or ambient or external light. In the optical path space a convolved optical path results which enables a compact setup. The spacer substrate may be implemented such that it absorbs electromagnetic radiation at least in the wavelength range for which the system is implemented, which may, for example, be executed by a substrate of absorbing material, by a coating with an absorbing material, such as, for example, PSK 2000, PSK 1000 or DARC 300, and/or by a structured surface with carbon nano tubes. The spacer substrate may be manufactured both in lithographic technology and also in another technology, such as, for example, plastic injection molding, laser processing, milling and/or drilling.

Generally, the substrates mentioned above may be manufactured in different ways. Lithographic methods may, for example, be used for the micromechanical substrate 12a and, as just mentioned, for the spacer substrate 12b. A molding technology may be used to define the optically relevant interior face of the optical substrate 12c. The substrates may be manufactured from semiconductor material, glass, polymer or the like. The same also applies for the components which were mentioned above.

As illustrated in the figures, a dimensioning of the above optical windows covered by a component along a lateral dimension, along which the convolved optical path is directed from the respective window or the optical aperture formed in the component covering the respective window, may be at least double a dimension of this optical aperture along the lateral dimension.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for manufacturing a spectral decomposition device, comprising:
    manufacturing a plurality of substrate stacks from structured substrates in which a buried optical path space is defined, wherein the optical path space comprises at least one window; and
    subsequent substrate stack-individual mounting of a component to the substrate stacks so that the respective component at least partially covers the at least one window, and so that an optical functional element comprising the component is adjacent to the buried optical path space via the at least one window in the substrate stack and helps to define a convolved optical path which forms in the buried optical path space and is defined by optics and an optical functional element comprising a spectrally decomposing effect, which are formed in the respective substrate stack with the mounted component; wherein
    the manufacturing the plurality of substrate stacks from structured substrates is performed on a wafer level so that the plurality of substrate stacks are processed parallel or substantially parallel to each other; and
    the subsequent substrate stack-individual mounting includes, for each of the plurality of substrate stacks individually, individually positioning the component so as to cover the at least one window with shifting of the component within a maneuvering distance laterally across the at least one window and fixing the component to the respective substrate stack.

2. The method according to claim 1, which is executed such that the spectral decomposition device is a spectral decomposition device comprising
    a substrate stack in which an optical functional element comprising a spectrally decomposing effect and optics are formed such that in the substrate stack a convolved optical path is formed which extends between an optical entry window formed in the substrate stack and an exit window or a detector zone formed in the substrate stack, wherein
        the spectral decomposition device additionally comprises an entry-side component which is mounted to the substrate stack such that it at least partially covers the optical entry window and which defines an optical entry aperture of the spectral decomposition device, and/or
        the spectral decomposition device additionally comprises an exit-side component which is mounted to the substrate stack such that it at least partially covers the optical exit window and which defines an optical exit aperture of the spectral decomposition device.

3. The method according to claim 1, which is executed such that the spectral decomposition device is a spectral decomposition device, comprising
    a substrate stack in which an optical functional element comprising a spectrally decomposing effect and optics are formed such that in the substrate stack a convolved optical path is formed which extends between an optical entry window formed in the substrate stack, and an optical exit window formed in the substrate stack, wherein the spectral decomposition device additionally comprises an exit-side component which is mounted to the substrate stack such that it at least partially covers the optical exit window and which comprises a detector which is implemented to detect electromagnetic radiation propagating through the optical exit window along the convolved optical path, wherein a projection of a beam-blocking part of the exit-side component along a layer thickness direction to the substrate stack is spaced apart laterally from the optical entry window and an edge of the substrate stack.

4. The method according to claim 1, which is executed such that the spectral decomposition device is a spectral decomposition device, comprising
    a substrate stack made of structured substrates in which a buried optical path space with an optical entry window and an optical intermediate window are defined; and
    a component with an optical functional element which is mounted to the substrate stack and which at least partially covers the optical intermediate window such that the optical functional element abuts on the buried optical path space via the optical intermediate window, and in the buried optical path space a convolved optical path forms which is defined by optics and an optical functional element comprising a spectrally decomposing effect and extends between the optical entry window and an optical exit window or a detector zone which is or are formed in the substrate stack, wherein the optical functional element is arranged at a bend of the convolved optical path and forms a first part of the optics, while a second part of the optics is formed in the substrate stack or comprises the optical functional element comprising a spectrally decomposing effect.

5. The method according to claim 1, wherein the subsequent substrate stack-individual mounting is executed by adjusting the optical functional element of the component, i.e. by active adjustment, wherein an influence of the adjustment onto the convolved optical path is evaluated at an exit aperture or detector zone location, or by passive adjustment, wherein the adjustment comprises an alignment regulation with respect to edges and/or corners of the substrate stacks.

6. The method according to claim 1, wherein the manufacturing the plurality of substrate stacks from structured substrates is performed using wafer bonding, and the fixing is performed by at least one of adhesive bonding, decanting, underfilling and soldering.

7. The method according to claim 1, further comprising separating, by wafer dicing, the plurality of substrate stacks.

8. The method according to claim 1, wherein the component defines an optical entry aperture or an optical exit aperture of the convolved optical path.

9. The method according to claim 1, wherein:
    the manufacturing the plurality of substrate stacks from structured substrates is performed such that the at least one window opens at a level portion of a main side of each of the substrate stacks; and the main side is formed and the subsequent substrate stack-individual mounting is performed such that, after fixing, the component has a lateral maneuvering distance along the level portion of at least 1 μm in a lateral dimension, along which the convolved optical path is directed at the at least one window.

\* \* \* \* \*